(12) United States Patent
Hansen et al.

(10) Patent No.: US 7,552,104 B2
(45) Date of Patent: Jun. 23, 2009

(54) DECISION SUPPORT SYSTEM AND METHOD

(76) Inventors: Paul Hansen, 24 Maitland Street, Dunedin (NZ); Franz Ombler, 19 Edinburgh Terrace, Berhampore, Wellington (NZ)

( * ) Notice: Subject to any disclaimer, the term of this patent is extended or adjusted under 35 U.S.C. 154(b) by 0 days.

(21) Appl. No.: 10/561,370

(22) PCT Filed: Jun. 14, 2004

(86) PCT No.: PCT/NZ2004/000121

§ 371 (c)(1),
(2), (4) Date: Jun. 2, 2006

(87) PCT Pub. No.: WO2004/111909

PCT Pub. Date: Dec. 23, 2004

(65) Prior Publication Data

US 2006/0241950 A1  Oct. 26, 2006

(30) Foreign Application Priority Data

Jun. 13, 2003  (NZ)  ..................................... 526447
Aug. 25, 2003  (NZ)  ..................................... 527785

(51) Int. Cl.
*G06N 5/04* (2006.01)
(52) U.S. Cl. ........................................................ 706/60
(58) Field of Classification Search .................... 706/60
See application file for complete search history.

(56) References Cited

U.S. PATENT DOCUMENTS

2002/0107821 A1  8/2002  Karas

2003/0182281 A1  9/2003  Wittkowski

FOREIGN PATENT DOCUMENTS

WO      WO 01/20530 A1      3/2001
WO      WO 2004/111906 A1 * 6/2004

OTHER PUBLICATIONS

Behnam Malakooti ("Ranking and Screening Multiple Criteria Alternatives with Partial Information and Use of Ordinal and Cardinal Strength of Preference" IEEE 2000).*
Johnson, Richard M. "Beyond Conjoint Measurement: A Method of PairWise Trade-Off Analysis," *Advances in Consumer Research*, vol. III, Proceedings of Association for Consumer Research, Sixth Annual Conference (1975). Published 1976, pp. 353-358.

* cited by examiner

*Primary Examiner*—David R Vincent
*Assistant Examiner*—Lut Wong
(74) *Attorney, Agent, or Firm*—Blakely, Sokoloff, Taylor & Zafman LLP

(57) ABSTRACT

The invention provides a decision support method for two or more pre-defined criteria and two or more profiles. Each criterion comprises two or more pre-defined and ordinally ranked categories. Each profile comprises a set of two or more of the criteria. Each criterion in the set is associated with one of the categories for that criterion. The method performs a comparative assessment of profiles involving an ordinal pairwise ranking of profile pairs. The method further comprises solving a system of equalities/inequalities that represents the ordinal pairwise rankings of profile pairs to obtain a point value for each category on each criterion and/or a ranking of all possible profiles and/or a ranking of a subset of all possible profiles. The invention also provides a related system and computer program.

12 Claims, 19 Drawing Sheets

HIP AND KNEE REPLACEMENT SURGERY PRIORITY CRITERIA TOOL

*PLEASE PRINT CLEARLY*

Provincial Health Care Number: _____
Patient Name: _____

Patient Age: _____     Sex: [circle one] M     F

[Tick one box]  ☐ Left Hip   ☐ Right Hip   ☐ Left Knee   ☐ Right Knee

[Tick one box]  ☐ Primary   ☐ Revision

Diagnosis: _____

Surgeon's Name: _____ Phone: _____

Date: _____

*Patients must be on appropriate non-surgical treatment prior to evaluation (e.g. medications, walking aids, shoe inserts)*

*Please check the box that most accurately describes the patient's current situation*

1. Pain on motion (e.g. walking, bending): \*
   ☐ None/mild
   ☐ Moderate
   ☐ Severe 2. Pain at rest (e.g. while sitting, lying down, or causing sleep disturbance): \*
   ☐ None
   ☐ Mild
   ☐ Moderate
   ☐ Severe \* *Take into account usual duration, intensity, and frequency of pain, including need for narcotic vs. non-narcotic medication.*

3. Ability to walk without significant pain :
   ☐ Over 5 blocks
   ☐ 1-5 blocks
   ☐ <1 block
   ☐ Household ambulator 4. Other functional limitations (e.g. putting on shoes, managing stairs, sitting to standing, sexual activity, bathing, cooking, recreation or hobbies):
   ☐ No limitations
   ☐ Mild limitations - able to do most activities with minor modifications or difficulty
   ☐ Moderate limitations - able to do most activities with modification or assistance
   ☐ Severe limitations - unable to perform most activities (PRIOR ART)

FIGURE 1

5. Abnormal findings on physical exam related to affected joint (e.g. deformity, instability, leg length difference, restriction of range of motion on examination):
   ☐ None/mild
   ☐ Moderate
   ☐ Severe 6. Potential for progression of disease documented by radiographic findings (e.g. recurrent dislocation, x-ray evidence of protrusion, significant bone loss, component wear, impending fracture):**
   ☐ None
   ☐ Mild
   ☐ Moderate
   ☐ Severe
   ** Predominantly applies to revisions, use in primary cases only in special circumstances (e.g. ligament instability, bone loss)

7. Threat to patient role and independence in society (i.e. ability to work, give care to dependants, live independently (difficulty must be related to affected joint)):
   ☐ Not threatened but more difficult
   ☐ Threatened but not immediately
   ☐ Immediately threatened or unable 8. All things considered, how would you rate the urgency or relative priority of this patient?
   (Draw a line across the scale.)

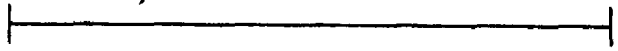

Not Urgent at all                                   Extremely Urgent
                                                       (just short of an emergency)

9. In your clinical judgement what should be the maximum waiting time for this patient?
   Number of weeks_____ OR Number of months _____

10. In your practice how long would it take this patient to have surgery done from the time you first see the patient?
    Number of days_____ OR Number of weeks_____ OR Number of months_____

Please record any comments on the form, criteria or process: _____
_____
_____
_____
_____
_____
_____

(PRIOR ART)

FIGURE 2

| versus (vs) | 221 a2+b2+c1 | 212 a2+b1+c2 | 122 a1+b2+c2 | 112 a1+b1+c2 | 121 a1+b2+c1 | 211 a2+b1+c1 |
|---|---|---|---|---|---|---|
| 221 a2+b2+c1 | | b2+c1 vs b1+c2 | a2+c1 vs a1+c2 | a2+b2+c1 vs a1+b1+c2 | n.a. | n.a. |
| 212 a2+b1+c2 | | | a2+b1 vs a1+b2 | n.a. | a2+b1+c2 vs a1+b2+c1 | n.a. |
| 122 a1+b2+c2 | | | | n.a. | n.a. | a1+b2+c2 vs a2+b1+c1 |
| 112 a1+b1+c2 | | | | | b1+c2 vs b2+c1 | a1+c2 vs a2+c1 |
| 121 a1+b2+c1 | | | | | | a1+b2 vs a2+b1 |
| 211 a2+b1+c1 | | | | | | |

FIGURE 6

| Criteria (x) | Categories (y) | Profiles ($y^x$) | Pairwise comparisons $y^x(y^x-1)/2$ | Degrees | Total ambiguities (Equation 1) | Unique ambiguities (Equation 2) |
|---|---|---|---|---|---|---|
| 3 | 2 | 8 | 28 | $2^{nd}$ | 6 | 3 |
|   |   |   |   | $3^{rd}$ | 3 | 3 |
|   |   |   |   | *All degrees:* | *9* | *6* |
| 3 | 3 | 27 | 351 | $2^{nd}$ | 81 | 27 |
|   |   |   |   | $3^{rd}$ | 81 | 81 |
|   |   |   |   | *All degrees:* | *162* | *108* |
| 3 | 4 | 64 | 2,016 | $2^{nd}$ | 432 | 108 |
|   |   |   |   | $3^{rd}$ | 648 | 648 |
|   |   |   |   | *All degrees:* | *1,080* | *756* |
| 4 | 2 | 16 | 120 | $2^{nd}$ | 24 | 6 |
|   |   |   |   | $3^{rd}$ | 24 | 12 |
|   |   |   |   | $4^{th}$ | 7 | 7 |
|   |   |   |   | *All degrees:* | *55* | *25* |
| 4 | 3 | 81 | 3,240 | $2^{nd}$ | 486 | 54 |
|   |   |   |   | $3^{rd}$ | 972 | 324 |
|   |   |   |   | $4^{th}$ | 567 | 567 |
|   |   |   |   | *All degrees:* | *2,025* | *945* |
| 4 | 4 | 256 | 32,640 | $2^{nd}$ | 3,456 | 216 |
|   |   |   |   | $3^{rd}$ | 10,368 | 2,592 |
|   |   |   |   | $4^{th}$ | 9,072 | 9,072 |
|   |   |   |   | *All degrees:* | *22,896* | *11,880* |
| 4 | 5 | 625 | 195,000 | $2^{nd}$ | 15,000 | 600 |
|   |   |   |   | $3^{rd}$ | 60,000 | 12,000 |
|   |   |   |   | $4^{th}$ | 70,000 | 70,000 |
|   |   |   |   | *All degrees:* | *145,000* | *82,600* |
| 5 | 2 | 32 | 496 | $2^{nd}$ | 80 | 10 |
|   |   |   |   | $3^{rd}$ | 120 | 30 |
|   |   |   |   | $4^{th}$ | 70 | 35 |
|   |   |   |   | $5^{th}$ | 15 | 15 |
|   |   |   |   | *All degrees:* | *285* | *90* |
| 5 | 3 | 243 | 29,403 | $2^{nd}$ | 2,430 | 90 |
|   |   |   |   | $3^{rd}$ | 7,290 | 810 |
|   |   |   |   | $4^{th}$ | 8,505 | 2,835 |
|   |   |   |   | $5^{th}$ | 3,645 | 3,645 |
|   |   |   |   | *All degrees:* | *21,870* | *7,380* |

FIGURE 7

| Criteria (x) | Categories (y) | Profiles ($y^x$) | Pairwise comparisons $y^x(y^x-1)/2$ | Degrees | Total ambiguities (Equation 1) | Unique ambiguities (Equation 2) |
|---|---|---|---|---|---|---|
| 5 | 4 | 1,024 | 523,776 | 2nd | 23,040 | 360 |
|   |   |   |   | 3rd | 103,680 | 6,480 |
|   |   |   |   | 4th | 181,440 | 45,360 |
|   |   |   |   | 5th | 116,640 | 116,640 |
|   |   |   |   | *All degrees:* | *424,800* | *168,840* |
| 5 | 5 | 3,125 | 4,881,250 | 2nd | 125,000 | 1,000 |
|   |   |   |   | 3rd | 750,000 | 30,000 |
|   |   |   |   | 4th | 1,750,000 | 350,000 |
|   |   |   |   | 5th | 1,500,000 | 1,500,000 |
|   |   |   |   | *All degrees:* | *4,125,000* | *1,881,000* |
| 6 | 2 | 64 | 2,016 | 2nd | 240 | 15 |
|   |   |   |   | 3rd | 480 | 60 |
|   |   |   |   | 4th | 420 | 105 |
|   |   |   |   | 5th | 180 | 90 |
|   |   |   |   | 6th | 31 | 31 |
|   |   |   |   | *All degrees:* | *1,351* | *301* |
| 6 | 3 | 729 | 265,356 | 2nd | 10,935 | 135 |
|   |   |   |   | 3rd | 43,740 | 1,620 |
|   |   |   |   | 4th | 76,545 | 8,505 |
|   |   |   |   | 5th | 65,610 | 21,870 |
|   |   |   |   | 6th | 22,599 | 22,599 |
|   |   |   |   | *All degrees:* | *219,429* | *54,729* |
| 6 | 4 | 4,096 | 8,386,560 | 2nd | 138,240 | 540 |
|   |   |   |   | 3rd | 829,440 | 12,960 |
|   |   |   |   | 4th | 2,177,280 | 136,080 |
|   |   |   |   | 5th | 2,799,360 | 699,840 |
|   |   |   |   | 6th | 1,446,336 | 1,446,336 |
|   |   |   |   | *All degrees:* | *7,390,656* | *2,295,756* |
| 10 | 4 | 1,048,576 | 549,755,289,600 | 2nd | 106,168,320 | 1,620 |
|   |   |   |   | 3rd | 1,274,019,840 | 77,760 |
|   |   |   |   | 4th | 7,803,371,520 | 1,905,120 |
|   |   |   |   | 5th | 30,098,718,720 | 29,393,280 |
|   |   |   |   | 6th | 77,755,023,360 | 303,730,560 |
|   |   |   |   | 7th | 135,444,234,240 | 2,116,316,160 |
|   |   |   |   | 8th | 153,584,087,040 | 9,599,005,440 |
|   |   |   |   | 9th | 102,792,499,200 | 25,698,124,800 |
|   |   |   |   | 10th | 30,898,215,936 | 30,898,215,936 |
|   |   |   |   | *All degrees:* | *539,756,338,176* | *68,646,770,676* |

FIGURE 8

| $3^{rd}$-degree ambiguity | Sufficient conditions for LHS > RHS of the $3^{rd}$-degree ambiguity |
|---|---|
| (4) $a2 + b2 + c1$ vs $a1 + b1 + c2$ | $a2 + c1 > a1 + c2$ <br> or $a2 + c1 = a1 + c2$ <br> or $b2 + c1 > b1 + c2$ <br> or $b2 + c1 = b1 + c2$ |
| (5) $a2 + b1 + c2$ vs $a1 + b2 + c1$ | $b1 + c2 > b2 + c1$ <br> or $b1 + c2 > b2 + c1$ <br> or $a2 + b1 = a1 + b2$ <br> or $a2 + b1 = a1 + b2$ |
| (6) $a1 + b2 + c2$ vs $a2 + b1 + c1$ | $a1 + c2 > a2 + c1$ <br> or $a1 + c2 = a2 + c1$ <br> or $a1 + b2 > a2 + b1$ <br> or $a1 + b2 = a2 + b1$ |

FIGURE 10

DECISION SUPPORT SYSTEM AND METHOD

CROSS-REFERENCE TO OTHER APPLICATIONS

This is a National Phase of International Application No. PCT/NZ2004/000121, filed on Jun. 14, 2004, which claims priority from New Zealand Patent Application No. 526447 filed on Jun. 13, 2003, and New Zealand Patent Application No. 527785 filed on Aug. 25, 2003.

FIELD OF INVENTION

In general terms, the invention relates to the field of Decision Analysis or Decision Support and in particular to additive points systems.

DETAILED DESCRIPTION OF THE DRAWINGS

Additive points systems (APSs), a type of multi-attribute utility or value model or multiple criteria decision analysis tool, are also known as 'linear', 'point-count' and 'scoring' systems. APSs are widely and increasingly used worldwide.

APSs represent a relatively simple solution to the pervasive problem faced by decision makers with multiple criteria, attributes, or characteristics to consider, particularly when ranking alternatives, individuals, or candidates. Hereinafter in this document alternatives, individuals, or candidates are referred to generically as 'alternatives', and criteria, attributes, and characteristics are referred to generically as 'criteria'.

Specifically, APSs serve to combine the features or performance of an alternative on multiple criteria to produce a single ranking of alternatives with respect to an over-arching criterion (such as, for example, the order in which to treat patients), or, more simply, to reach a decision (for example, deciding whether or not to admit an immigrant or determining the best site for a building).

APSs have been found in many studies to be more accurate than 'expert' decision makers in the respective fields to which they have been applied. In addition APSs are relatively simple to use.

Two or more criteria that are deemed to be relevant to the overarching criterion are typically established. For each criterion, an alternative can usually be assigned to a category (also referred to as giving an alternative a categorical rating), with each category (or categorical rating) scoring a particular number of points. The points are summed (hence additive points systems, APSs) to produce a total score for the alternative. Typically the number of points scored by a category will be higher if it is considered that an alternative that has that particular categorical rating for the corresponding criterion should generally be considered favourably with respect to the overarching criterion.

Alternatives are ranked with respect to the over-arching criterion according to their total scores. Usually the higher an alternative's score the higher its ranking, and the scores typically have no other meaning than this. In some cases, alternatives are declined or rejected altogether from further consideration if a particular score 'threshold' is not reached.

Most APSs for elective surgeries and immigration respectively (the examples referred to above), have between five and seven criteria and two to five categories on each criterion. FIGS. 1 and 2 show an example of an APS used in Canada for prioritising patients for hip or knee replacement surgery.

In this example there are seven criteria, mostly based on types of pain and functional limitations. Each criterion has a number of mutually exclusive and exhaustive categories on which the consulted decision maker (usually a doctor) is asked to rate the patient being considered. For example, item 2 in FIG. 1, refers to the criterion of "Pain at Rest" and requires that the patient be assigned to one of four categories: "None", "Mild", "Moderate" or "Severe".

In general, if the criteria and the categories on each have been chosen for a particular APS, then the point values for that APS must be determined (scored or calibrated) such that the resulting ranking of alternatives represents the decision makers' preferences.

In addition to the arbitrary assignment of point values, there are two main existing approaches to calibrating APSs.

The first regresses decision makers' judgements of the relative priorities or importance of a sample of real or hypothetical alternative 'profiles' in terms of the criteria (where a profile comprises the categorical ratings of the real or hypothetical alternative on the chosen criteria) and derives point values from the regression coefficients. Usually only a small proportion of existing or theoretically possible profiles is surveyed because of the responder burden on the consulted decision makers.

The above-mentioned decision makers' judgements are often elicited via a visual analogue scale (VAS). Item 8 of FIG. 2 is such a VAS, where the decision maker is asked "to rate the urgency or relative priority of this patient" between "Not urgent at all" and "Extremely urgent (just short of an emergency)". This 'score' and the patient's categorical ratings in terms of criteria 1 to 7 shown in FIGS. 1 and 2, along with analogous data for other patients, may then be used to calibrate the point values for the various criteria and categories using multiple regression techniques, as explained above.

The second existing approach to calibrating APSs uses decision makers' judgements of the pairwise relative importance of the APS's criteria to derive ratio scale weights. These weights are then applied to normalised criteria values to derive point values. An example of this type of technique is the Analytic Hierarchical Process (AHP). Other examples are the Simple Multiattribute Rating Technique (SMART) and SMARTER and SWING.

Thus the first approach assumes that decision makers' judgements have interval scale measurement properties and the second approach assumes they have interval and ratio scale properties respectively. Both of these measurement property assumptions are relatively stringent and current techniques for eliciting decision makers' judgements have well-known biases. With respect to the first approach, for example, the validity of the dependent variable (the experts' judgments) and therefore the point values derived from the estimated coefficients, can be criticised on two main grounds.

First, the scaling methods such as the VAS used to elicit the experts' judgments of the profiles' relative priorities are based on mere introspection rather than the expression of a choice. Second, VAS in general may not actually have the scaling measurement properties required for the valuations that they produce to be interpreted as relative priorities rather than just as rankings.

It is therefore desirable to have a method of calibrating new APSs or recalibrating or validating extant ones that requires only ordinal measurement properties, specifically the positive expression of a ranking over pairs of alternatives. It would also be desirable for this method to achieve accurate results while reducing the burden on decision makers of ranking pairs of alternatives by minimising the number of pairs they have to rank.

SUMMARY OF THE INVENTION

In broad terms, in one form the invention provides a decision support method comprising: for two or more pre-defined criteria, with each criterion associated with one or more pre-defined categories, determining a point value for each category on each criterion by the pairwise ranking of profile pairs wherein each profile comprises a set of two or more of the criteria, each criterion in the set instantiated with one of the categories for that criterion.

In broad terms in another form, the invention provides a decision support system comprising: a pre-determined plurality of criteria stored in computer memory, each criterion capable of being instantiated with one or more pre-defined categories; and a points calibrator configured to determine appropriate points for one or more categories of two or more of the criteria by performing the pairwise ranking of profile pairs, each profile comprising a set of two or more of the criteria, each criterion in the set instantiated with one of the categories for that criterion.

In broad terms in yet another form the invention provides a decision support computer program comprising: an initialisation component configured to receive and store data representing two or more criteria and one or more categories with which each criterion may be instantiated; and a points calibrator configured to determine point values for one or more categories of two or more of the criteria by performing the pairwise ranking of profile pairs each profile comprising a set of two or more of the criteria, each criterion in the set instantiated with one of the categories for that criterion.

BRIEF DESCRIPTION OF THE FIGURES

Preferred forms of the decision support method, system, and computer program will now be described with reference to the accompanying figures in which:

FIG. 1 shows a prior art means of eliciting expert judgments for the purposes of calibrating an APS via multiple regression-based techniques;

FIG. 2 shows a continuation of the prior art means of eliciting expert judgments for the purposes of calibrating an APS via multimedia regression-based techniques;

FIG. 6 is a table showing ambiguities (also known as 'undominated profile pairs')from six profiles (excluding those that are unambiguous pairwise ranked) for an exemplar APS with three criteria and two categories each;

FIG. 7 is a table of total and unique ambiguities for different APSs and degrees;

FIG. 8 is a continuation of the table from FIG. 7 of total and unique ambiguities for different APSs and degrees;

FIG. 10 is a table of sufficient (but not necessary) conditions for implicitly resolving $3^{rd}$-degree ambiguities of an exemplar APS with three criteria and two categories each;

DETAILED DESCRIPTION OF THE PREFERRED FORMS

The invention is primarily embodied in the methodology set out below both by itself and as implemented through computing resources such as the preferred resources set out in FIG. 3, by way of example. The invention is also embodied in the software (or computer program) used to implement the methodology and in any system comprising a combination of hardware and software used to implement the methodology.

In its most preferred form the invention is implemented on a personal computer, workstation, or server operating under the control of appropriate operating and application software.

It will however be appreciated that the invention may also be implemented on any computing device with sufficient memory and processing capacity.

Figure 3:
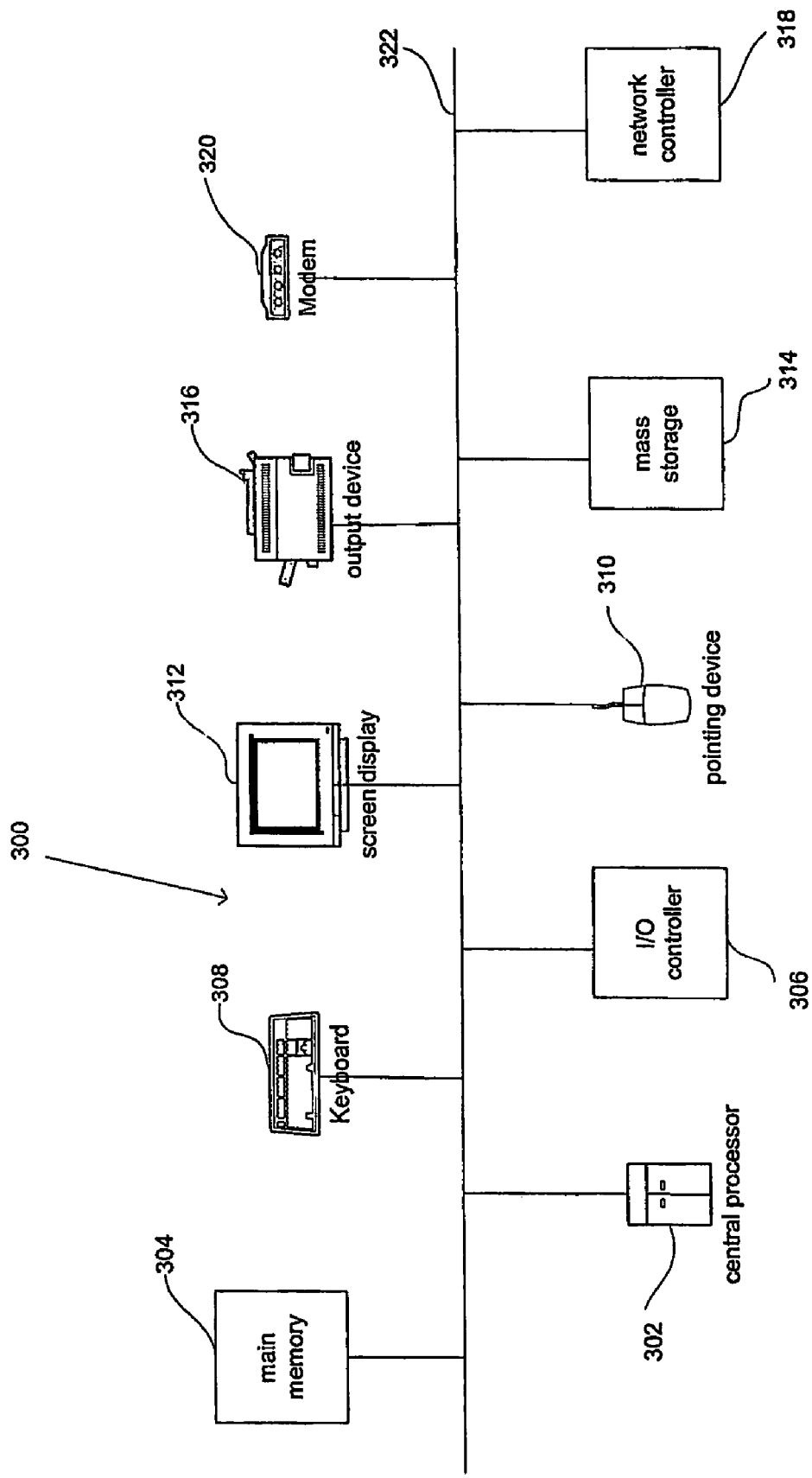
FIG. 3 shows a preferred configuration of hardware for carrying out the invention.

FIG. 3 shows one preferred system architecture of a personal computer, workstation, or server on which the invention could be implemented. The computer system 300 typically comprises a central processor 302, a main memory 304, for example RAM, and an input/output controller 306. The computer system 300 may also comprise peripherals such as a keyboard 308, a pointing device 310, for example a mouse, touchpad, or trackball, a display or screen device 312, a mass storage memory 314, for example a hard disk, floppy disk or optical disc and an output device 316 such as a printer. The system 300 could also include a network interface card or controller 318 and/or a modem 320. The individual components of the system 300 could communicate through a system bus 322.

There are two main types of APS application, which differ mainly with respect to their scale, in terms of the number of alternatives or individuals they include. The present invention may be used for both types of APS application.

The first type of APS application may be described in general terms as involving the ranking of large or very large numbers of alternatives, for example, 100s, 1000s or millions of alternatives. These alternatives represent all theoretically possible alternatives, as defined by the categorical ratings for the criteria by which each alternative is distinguished, including alternatives that may or may not yet exist and that are purely theoretical or hypothetical.

APSs are widely and increasingly used worldwide for selecting immigrants. For example, APSs are used by the immigration systems of New Zealand, Canada, Australia, Germany and the United Kingdom. They are also widely and increasingly used worldwide in most branches of medicine for diagnosing and prioritising patients and managing waiting lists. For example, APSs were recently developed by the health systems of Canada and New Zealand for prioritising and managing access to a wide range of elective surgeries and other publicly-funded health cares.

APS may also be used in a wide range of other applications, including choosing and appraising employees, admitting students to restricted courses, environmental assessments, assessing mortgage applications and predicting parole violations, business bankruptcies and college graduations, for example.

The second type of APS application is similar to the first one above except that instead of all theoretically possible alternatives, the focus is a subset of alternatives such that the 'best' alternative is chosen from a restricted group of alternatives and/or they are ranked. Thus the number of alternatives to be ranked is smaller and is usually restricted to alternatives that are known to the decision maker. In general, this serves to reduce the amount of effort required of decision makers in reaching their decision.

Examples of this type of APS application include short-listing job applicants, appraising investment projects, identifying desirable new product ideas or features for commercialisation, choosing the best site for a building or house or model of car to buy, and so on. APSs may also be used as a generic project appraisal tool.

The decision support method, system, and computer program of the present invention is able to score or calibrate an entire APS involving a very large number of alternatives including theoretical alternatives. However the decision support method, system, and computer program of the present invention is also able to rank a restricted group of alternatives and/or choose a 'best' alternative from a restricted group before an APS is fully calibrated.

The method of the present invention will now be described with reference to several examples, beginning with an APS with just three criteria: denoted by a, b and c; and two categories on each: denoted by 1 and 2; such that there are six criterion-category variables: a1, a2, b1, b2, c1 and c2.

For example, if this were an APS for selecting immigrants, criterion a might be 'educational qualifications', b 'wealth' and c 'language proficiency'. Category 1 might be generically defined as 'low' and 2 as 'high'. Real immigration APSs, however, typically have at least twice as many criteria and categories as this simple example.

By definition, the values of these variables monotonically increase with the categories within each criterion so that the following 'inherent inequalities' hold: a2>a1, b2>b1 and c2>c1.

Corresponding to all possible combinations of the two categories on the abc criteria, eight profiles, each with a total score equation, are represented by this system (where the three-digit numbers are symbolic representations only):

$222 = a2+b2+c2$ $221 = a2+b2+c1$ $212 = a2+b1+c2$ $122 = a1+b2+c2$ $112 = a1+b1+c2$ $121 = a1+b2+c1$ $211 = a2+b1+c1$ $111 = a1+b1+c1$

With respect to determining (scoring or calibrating) the points values of APSs, the essence of calibrating an APS such as this one is deciding the point values of the six variables (a1, a2, b1, b2, c1 and c2) such that decision makers' preferred (or 'valid') overall ranking of the eight profiles (equations) is realised.

With respect to ranking a restricted group of alternatives or choosing the 'best' alternative from the group, the essence of doing so with an APS such as this one is deciding the point values of some or all of the variables such that decision makers' preferred overall ranking of the restricted group of alternatives is realised or the 'best' one is chosen before the APS is fully calibrated.

For example, such a ranking may be desired of the restricted group of four alternatives represented by the four profiles:

| | | |
|---|---|---|
| Alternative 1: | $221 = a2+b2+c1$ | |
| Alternative 2: | $122 = a1+b2+c2$ | |
| Alternative 3: | $212 = a2+b1+c2$ | |
| Alternative 4: | $211 = a2+b1+c1$ | |

Figure 4:
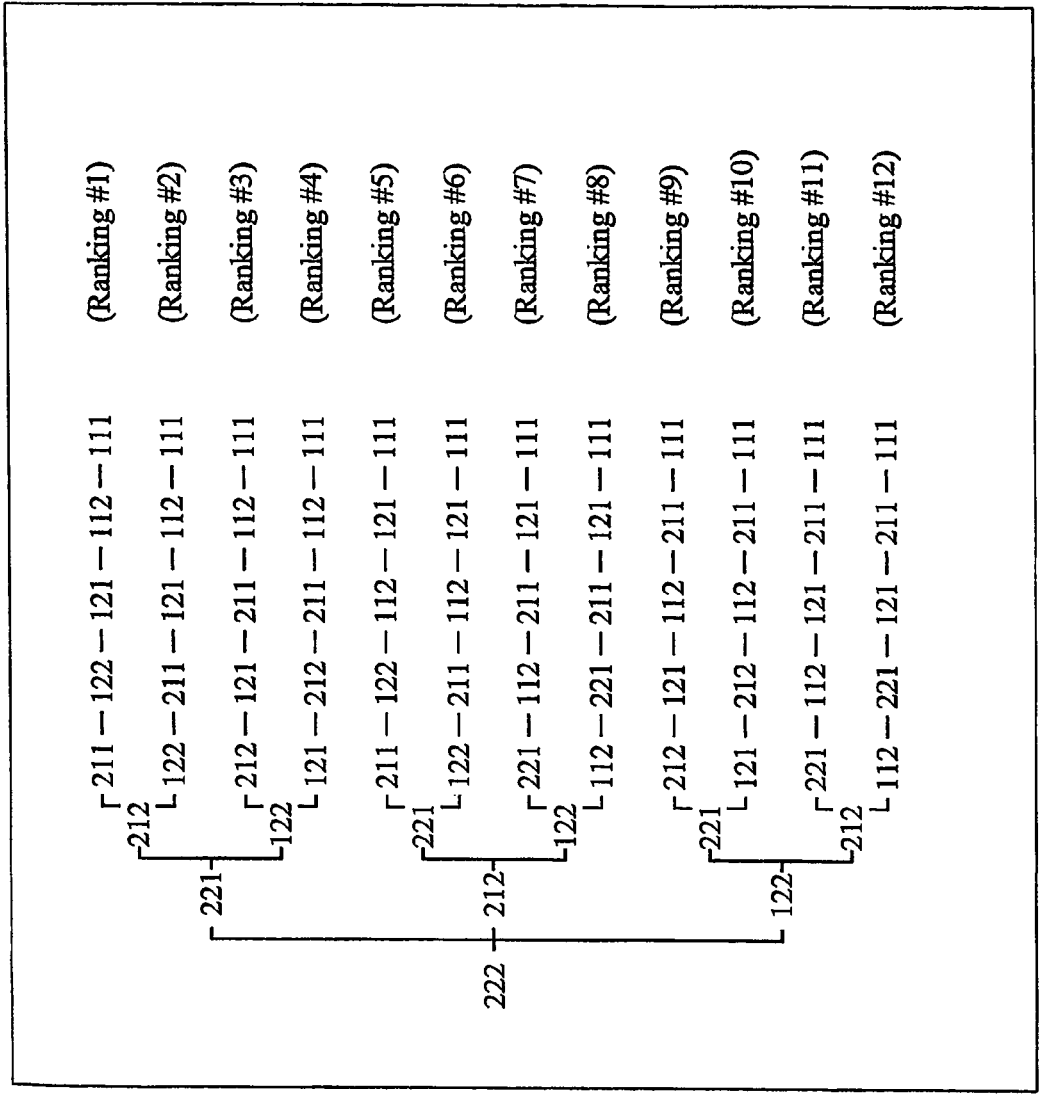
FIG. 4 shows a decision tree identifying 12 rankings of 8 profiles possible in an exemplar APS with three criteria and two categories each and allowing strict preferences only and no ties (for illustrative purposes only)

With respect to the full set of all eight possible profiles, the internal logic of APSs restricts the otherwise 8!=40,320 possible rankings (or all possible permutations), given strict preferences only and no ties (for illustrative purposes only), to the 12 rankings represented via the decision tree shown in FIG. 4. The decision tree highlights the inherent contingencies in the derivations of the profiles' rankings.

Any of the 12 rankings shown in FIG. 4 can be produced from the six variables, depending on the values chosen for them. Ranking #1, for example, is given by a1=0, a2=4, b1=0, b2=2, c1=0 and c2=1, with the total scores: 222=7, 221=6, 212=5, 211=4, 122=3, 121=2, 112=1 and 111=0. Alternatively, ranking #12, for example, is given by a1=0, a2=1, b1=0, b2=2, c1=0 and c2=4, with the total scores: 222=7, 122=6, 212=5, 112=4, 221=3, 121=2, 211=1 and 111=0.

Similarly, different rankings of the restricted group of Alternatives 1 to 4 can be produced from the six variables, depending on the values chosen for them. All such rankings can also be identified in FIG. 4.

In general, any particular ranking of profiles is determined by pairwise ranking the profiles vis-à-vis each other. For an APS with x criteria and y categories on each, and $y^x$ profiles, a maximum of $$\frac{y^x(y^x-1)}{2}$$

pairwise rankings is possible. Thus for the exemplar APS with x=3 and y=2, and $2^3$ (or eight) profiles, there is a maximum of 8(8−1)/2 (or 28) pairwise rankings. Similarly, for the restricted group of Alternatives 1 to 4, there is a maximum of 4(4−1)/2 (or 6) pairwise rankings.

Figure 5:
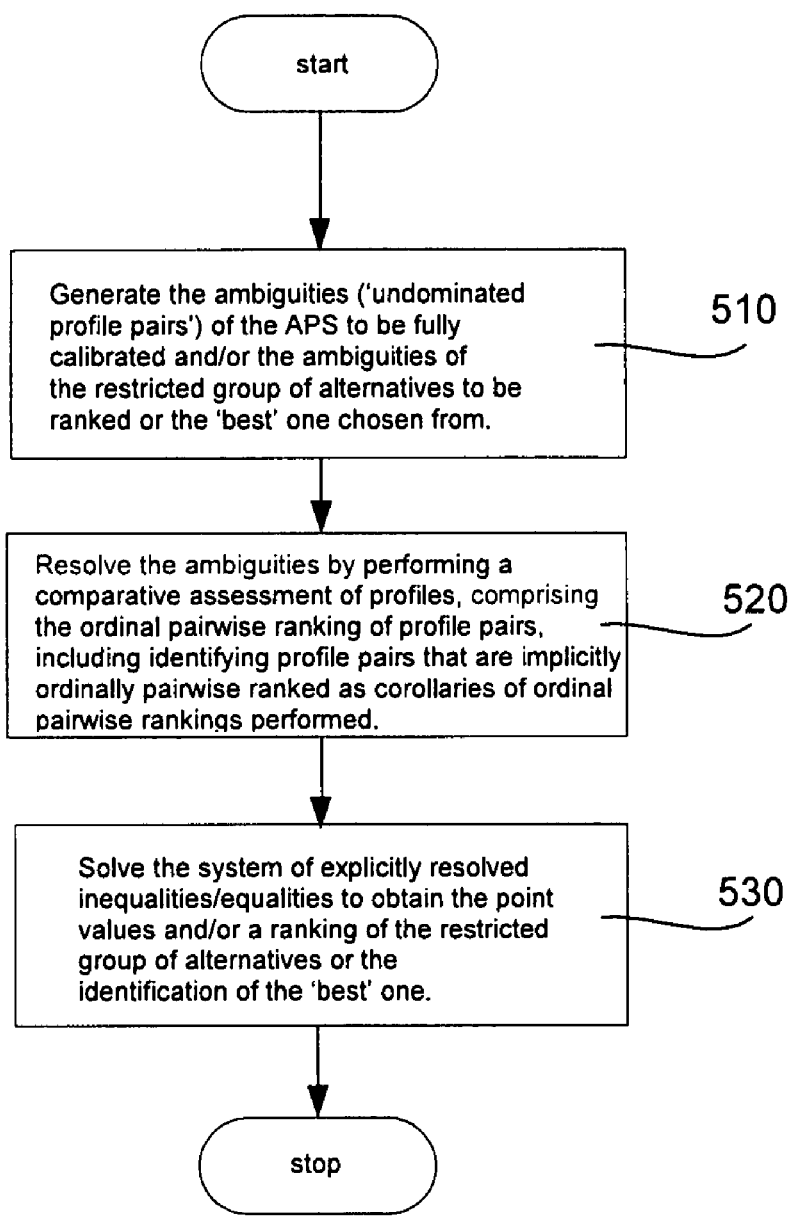
FIG. 5 is a flow diagram illustrating one preferred form for carrying out the invention.

The method of the invention may minimise the number of pairwise rankings that must be decided explicitly (via value judgements). In the case of the full set of all eight possible profiles, in this example, a minimum of two and a maximum of four pairwise rankings, rather than 28, is required, with the remaining pairwise rankings implicitly resolved as corollaries of the explicit rankings. The pairwise ranking performed by the invention may therefore comprise, in broad terms, three steps, as explained in turn below. The three main steps in the pairwise ranking are illustrated in FIG. 5.

The first step in the pairwise ranking as illustrated at 510 involves identifying (or 'generating') the 'ambiguities' of the APS that is being fully calibrated and/or the ambiguities of the restricted group of alternatives that is being ranked or from which the 'best' alternative or alternatives are chosen.

Ambiguities are formed from the total score equations of profile pairs whose pairwise rankings are a priori ambiguous, given the inherent inequalities (as explained above, a2>a1, b2>b1 and c2>c1 in the present example). These are profile pairs in which one profile has a higher categorical rating on at least one criterion and a lower rating on at least one other criterion than the other profile. In other words, neither of the profiles in the pair 'dominate' the other profile; or both profiles are 'undominated' by the other.

For example, the pairwise ranking of profiles 221 and 212—hereinafter referred to as "221 vs 212" and corresponding to a2+b2+c1 vs a2+b1+c2—is ambiguous given a2>a1, b2>b1 and c2>c1, as noted above. In other words, 221 does not 'dominate' 212, and vice versa. 'Ambiguous profile pairs', or 'ambiguities' in their reduced form equation forms, may also be referred to as 'undominated pairs' and 'dilemmas' respectively. Hereinafter in this document 'undominated pairs' and 'dilemmas' are referred to generically as 'ambiguous profile pairs' or 'ambiguities'.

On the other hand, many profile pairs are unambiguously ranked. For example, 222 (a2+b2+c2) is always pairwise ranked first and 111 (a1+b1+c1) is always pairwise ranked second. For example, a2+b2+c2 (222)>a1+b2+c2 (122) and a1+b2+c2 (122)>a1+b1+c1 (111), and so on. In other words, 222 'dominates' 111; and 111 is 'dominated' by 222. Other profile pairs are similarly unambiguously ranked, for example, a1+b2+c2>a1+b1+c2 (122>112), and so on.

As described above, identifying and eliminating all possible unambiguous pairwise rankings serves to cull the rankings required for the possible profiles. In the illustrative example shown in FIG. 4, the pairwise rankings required for the 8 possible profiles can be reduced from 8! permutations (40,320) to 48 (for illustrative purposes only, given strict preferences only and no ties) from which the 12 rankings in FIG. 4 are finally arrived at as described below.

The method of the invention identifies and excludes profile pairs that are unambiguously ranked and then focuses exclusively on profile pairs that are ambiguously ranked. It does this for all possible alternatives and/or the restricted group of alternatives.

Some ambiguously ranked profile pairs can be 'reduced' by cancelling variables that are common to both profile equations. Thus a2+b2+c1 vs a2+b1+c2 (221 vs 212, as above), for example, can be reduced to b2+c1 vs b1+c2 by cancelling a2 from the equations of both profiles. In effect, because a2 appears in both equations it has no bearing on the ranking of the two profiles that the equations represent. Such reduced forms may be referred to as 'ambiguities'.

Moreover b2+c1 vs b1+c2 also corresponds to 121 vs 112, as a1+b2+c1 vs a1+b1+c2 reduces to b2+c1 vs b1+c2 after cancelling the a1 terms from both profiles' equations. Thus b2+c1 vs b1+c2 represents two ambiguously ranked profile pairs: 121 vs 112 and 221 vs 212.

However, not all ambiguously ranked profile pairs are reducible in this fashion. For example, no variables can be cancelled from a2+b2+c1 vs a1+b1+c2 (221 vs 112), as none are common to both profiles' equations. Nonetheless, such irreducible ambiguously ranked profile pairs are also hereinafter referred to as ambiguities.

Accordingly ambiguities can be classified by the number of criteria they contain, hereinafter referred to as the 'degree' of the ambiguity. Thus '$2^{nd}$-degree' ambiguities contain two criteria, for example, b2+c1 vs b1+c2, as above; and '$3^{rd}$-degree' ambiguities contain three criteria, for example, a2+b2+c1 vs a1+b1+c2, as above; and so on.

In general, the ambiguities for an APS with x criteria range from $2^{nd}$-degree to $x^{th}$-degree.

The algorithmically simplest process for generating ambiguities is to first create all $y^x$ combinations of the y categories on the x criteria (that is, all profiles), and then pairwise rank them all against each other to identify pairs in which one profile has a higher categorical rating on at least one criterion and a lower categorical rating on at least one other criterion. There will always be a total of $$\frac{y^x(y^x-1)}{2}$$

pairwise rankings.

As each ambiguously ranked profile pair is identified, it is reduced where possible by cancelling variables in both profiles' equations, and the ambiguously ranked profile pair is then retained only if the resulting ambiguity has not already been generated. In other words, replicated ambiguities are discarded. This process for generating ambiguities is referred to below as 'the simple method for generating ambiguities'.

Accordingly the ambiguities for the exemplar APS with x=3 and y=2 from FIG. 4 are set out in FIG. 6. In FIG. 6, rankings that are unambiguous are denoted by 'n.a.'. The blank elements of the matrix, except for the main diagonal, are mirror images of the ones reported, and shaded ambiguities are duplicates of ones reported earlier in the table.

Thus it can be seen in FIG. 6 that although there are nine ambiguities in total, only six are unique:

(1) $b2+c1$ vs $b1+c2$ (2) $a2+c1$ vs $a1+c2$ (3) $a2+b1$ vs $a1+b2$ (4) $a2+b2+c1$ vs $a1+b1+c2$ (5) $a2+b1+c2$ vs $a1+b2+c1$ (6) $a1+b2+c2$ vs $a2+b1+c1$

Clearly ambiguities (1) to (3) are $2^{nd}$-degree ambiguities (and are duplicated in the figure) and ambiguities (4) to (6) are $3^{rd}$-degree ambiguities.

Similarly, the ambiguities for the restricted group of Alternatives 1 to 4 in the example mentioned earlier are:

(1) $b2+c1$ vs $b1+c2$ (2) $a2+c1$ vs $a1+c2$ (3) $a2+b1$ vs $a1+b2$ (6) $a1+b2+c2$ vs $a2+b1+c1$

In general, the number of ambiguities of each degree for a given APS can be calculated from the two equations described below.

For a given APS with x criteria and y categories on each criterion, the total number of ambiguities (including replicas) of a given degree (z) is given by:

$$\frac{x!}{(x-z)!z!} \times (2^{z-1}-1) \times \left(\frac{y(y-1)}{2}\right)^z \times y^{x-z} \quad (1)$$

The first term corresponds to $^xC_z$ (the usual combinations formula); the second term is the powers of 2 and minus one; the third term is $^yC_2$ raised to the $z^{th}$-power or, alternatively, the sum of the first y−1 natural numbers (for example, 5(5−1)/2=10=1+2+3+4) raised to the $z^{th}$-power; and the last term is a power function.

Of these ambiguities, the number of unique ambiguities (excluding replicas) of a given degree is given by:

$$\frac{x!}{(x-z)!z!} \times (2^{z-1}-1) \times \left(\frac{y(y-1)}{2}\right)^z \quad (2)$$

The two equations (1) and (2) differ only by the term $(x)y^{x-z}$. The meaning of this and the other three terms (common to both equations) is discussed further below when an alternative process for generating ambiguities is described.

Equations (1) and (2) can be compared with the equation mentioned earlier for the total number of pairwise rankings (including unambiguous ones):

$$\frac{y^x(y^x-1)}{2}.$$

Equation (2) is particularly useful because it reveals how many ambiguities at each degree must be resolved for any given APS. FIGS. 7 and 8 report the numbers of total and unique ambiguities for different APSs and degrees. As illustrated there, the number of ambiguities can be relatively large even for small values of x and y. For example, an APS with x=6 and y=4 (twice the values for the exemplar APS above) has a total of 2,295,756 unique ambiguities across its five degrees ($2^{nd}$ to $6^{th}$).

The simple method for generating ambiguities described above is further simplified if any profiles that are theoretically impossible are eliminated from the set to be pairwise ranked before any ambiguities are generated.

For example, in the APS for hip or knee replacements referred to in FIGS. 1 and 2 it would be a contradiction for a patient to be rated as having "severe" "Pain on motion (for example, walking, bending)" while also being rated on another of the criteria as having the "Ability to walk without significant pain" for a distance of "over 5 blocks". Such a combination of categories on these two criteria is theoretically impossible and therefore all profiles that include it could be deleted from the list to be pairwise ranked.

Similarly, when validating an extant APS (rather than calibrating a new one), the profiles to be evaluated can be determined from a 'stock take' of the alternatives ranked by the APS over its lifetime. Any other profiles that might realistically be expected in the future could be added.

This process also serves to increase the efficiency of later steps of the preferred method of the invention described below, as in general the more profiles that are eliminated, the fewer ambiguities there are, and therefore the simpler the calibration exercise is.

Notwithstanding such refinements, the simple method for generating ambiguities described above may be computationally inefficient for fully calibrating an APS because profile comparisons and pairwise rankings that are ultimately unnecessary may be performed and replicated ambiguities discarded.

For example, to generate the above-mentioned 2,295,756 ambiguities for an APS with x=6 and y=4, as can be calculated from the data in FIG. 8, 6,090,804 unnecessary profile pairwise rankings are performed and 5,094,900 ambiguities are discarded.

However, the simple method for generating ambiguities described above may be computationally efficient for generating the ambiguities for a restricted group of alternatives. Therefore it is a particularly preferred process for generating ambiguities for a restricted group of alternatives, and it is also a particularly preferred process for doing this for the computer program of the invention.

Figure 9:
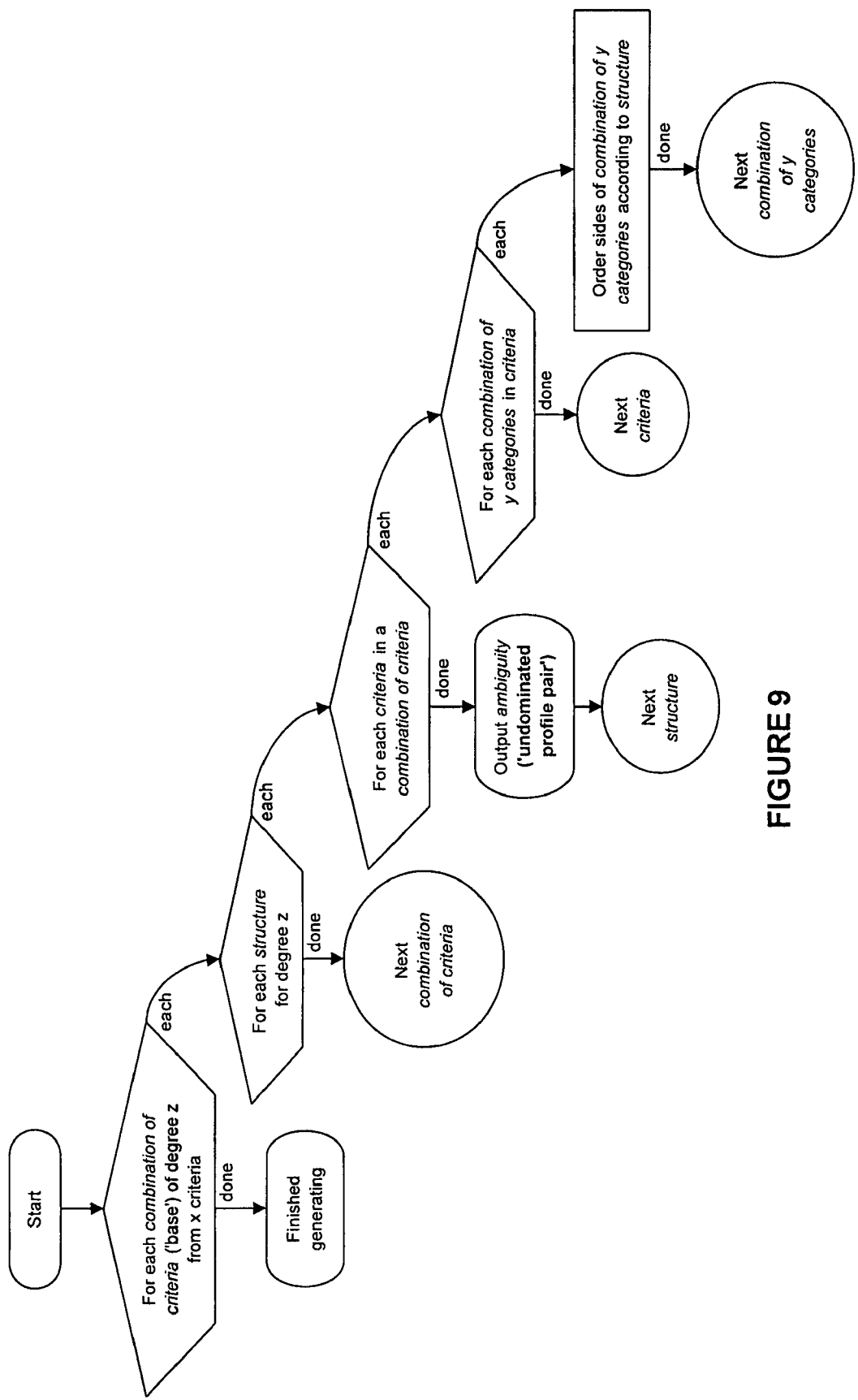
FIG. 9 is a flow diagram illustrating the main components of the 'efficient ambiguities generator' for generating undominated profile pairs described in Step 1 of the method of the invention.

A particularly preferred process for generating ambiguities for fully calibrating an APS according to the invention is described below. This is also a preferred process for a computer program for fully calibrating an APS according to the invention. The main steps in the process are illustrated in FIG. 9.

The particularly preferred process for fully calibrating an APS, hereinafter referred to as the 'efficient ambiguities generator', is described with explicit reference to the three terms in equation (2) above (reproduced below) and a specific example. The example is that of generating the $3^{rd}$-degree ambiguities for an APS with x=5 and y=3, of which there are 810 in total (as can be calculated from equation (2) and is reported in FIG. 7).

Although the equation applies to APSs with the same number of categories on the criteria, as explained later below, the process can be generalised to allow the number of categories to vary across criteria. For example, instead of y=3 for all 5 criteria in the above-mentioned APS, as is applied later, criterion a could have two categories, b three categories, c four, and so on.

$$\frac{x!}{(x-z)!z!} \times (2^{z-1}-1) \times \left(\frac{y(y-1)}{2}\right)^z \quad (2)$$

Equation (2)'s first term—

$$\frac{x!}{(x-z)!z!}$$

($=^xC_z$, the combinations formula)—is the number of combinations of z criteria that can be selected from x criteria.

For the above-mentioned APS with x=5 (that is, criteria a, b, c, d and e), 10 combinations of three criteria (z=3) are possible: abc, abd, abe, acd, ace, ade, bcd, bce, bde and cde.

Each combination can be thought of as forming the 'base' for a group of ambiguities. For example, abc is the base for all $3^{rd}$-degree ambiguities centred on a+b+c vs a+b+c (hereinafter abbreviated to abc vs abc), such as a2+b3+c3 vs a3+b2+c2.

Because the criteria in each base (10 of them in the present example) have the same number of categories each, the bases can be treated identically with respect to the following operations that correspond to the other two terms in equation (2).

The second term ($2^{z-1}-1$) can be interpreted as representing the number of underlying structures for a given degree (z).

Structures are generated by first listing the numbers between 1 and $2^{z-1}-1$ in binary form using z bits, where each bit represents a criterion of two categories represented by either 0 or 1.

Continuing with the example of generating the $3^{rd}$-degree ambiguities for an APS with x=5, the structures for z=3 are:

011
010
001

These structures correspond to 3, 2, and 1 in binary form. For now, each structure can be thought of as being analogous to a profile with y=2 for all criteria. Therefore only one ambiguity can be created from each, which is done by finding each structure's 'is complement', that is, by 'flipping the bits'; thus in the example:

011 vs 100
010 vs 101
001 vs 110

Each term (either a '0' or a '1') on either side of the ambiguity structure represents a criterion, and for each criterion their relative magnitudes ('0' versus '1') represents the relative magnitude of the categories they represent (in other words 'low' or 'high'), such that each structure has an underlying pattern.

Thus 011 vs 100 in the example above (and analogously for 010 vs 101 and 001 vs 110) signifies that the first of the three criteria represented (corresponding to 0__ vs 1__) has a lower category on the left hand side (LHS) and a higher category on the right hand side (RHS) of each ambiguity that is derived from it.

Similarly, the second and third criteria (corresponding to _11 vs _00) both have higher categories on the LHS and lower categories on the RHS.

The equation's third term—

$$\left(\frac{y(y-1)}{2}\right)^z$$

—is the number of ambiguities that can be generated from each ambiguity structure, as determined by the number of categories (y) on the criteria in a given base. There are three steps to generating these ambiguities, as follows.

First, all of the bases are matched with all of the structures. In the present example, the 10 bases (abc, abd, abe, acd, ace, ade, bcd, bce, bde and cde) are matched with the three structures (011 vs 100, 010 vs 101 and 001 vs 110) to produce 10×3=30 matches:

abc vs abc with 011 vs 100
abc vs abc with 010 vs 101
abc vs abc with 001 vs 110
abd vs abd with 011 vs 100
. . . and so on for another 26 matches.

Second, the underlying 'pattern' for each match (that is, a base with a structure) is implemented, according to the number of categories on the bases.

For abc vs abc with 011 vs 100, for example, with three categories on the criteria (y=3), there are three ways each (that is, $$\frac{y(y-1)}{2} = 3(3-1)/2$$

ways) of representing criterion a with a lower category on the LHS and a higher category on the RHS (0__ vs 1__, and criteria b and c both with higher categories on the LHS and lower categories on the RHS (_11 vs _00):

| a2 vs a3 | b3 vs b2 | c3 vs c2 |
| a1 vs a3 | b3 vs b1 | c3 vs c1 |
| a1 vs a2 | b2 vs b1 | c2 vs c1 |

The number of combinations of categories (within the criterion) taken two-at-a-time is $$\frac{y(y-1)}{2} = {}^yC_2.$$

The output listed above embodies these combinations, where the two categories are simply ordered as required by the structure.

Finally, all 3×3×3=27 possible combinations (in other words $$\left(\frac{y(y-1)}{2}\right)^z = [3(3-1)/2]^3)$$

of these three patterns are formed, thereby obtaining all 27 $3^{rd}$-degree ambiguities corresponding to the match abc vs abc with 011 vs 100:

a2+b3+c3 vs a3+b2+c2
a2+b3+c3 vs a3+b2+c1
a2+b3+c2 vs a3+b2+c1
a2+b3+c3 vs a3+b1+c2
a2+b3+c3 vs a3+b1+c1
a2+b3+c2 vs a3+b1+c1
a2+b2+c3 vs a3+b1+c2
a2+b2+c3 vs a3+b1+c1
a2+b2+c2 vs a3+b1+c1
a1+b3+c3 vs a3+b2+c2
a1+b3+c3 vs a3+b2+c1
a1+b3+c2 vs a3+b2+c1
a1+b3+c3 vs a3+b1+c2
a1+b3+c3 vs a3+b1+c1
a1+b3+c2 vs a3+b1+c1
a1+b2+c3 vs a3+b1+c2
a1+b2+c3 vs a3+b1+c1
a1+b2+c2 vs a3+b1+c1
a1+b3+c3 vs a2+b2+c2
a1+b3+c3 vs a2+b2+c1
a1+b3+c2 vs a2+b2+c1
a1+b3+c3 vs a2+b1+c2
a1+b3+c3 vs a2+b1+c1
a1+b3+c2 vs a2+b1+c1
a1+b2+c3 vs a2+b1+c2
a1+b2+c3 vs a2+b1+c1
a1+b2+c2 vs a2+b1+c1

Analogues of the three steps explained above may be performed for all matches. For each of the 30 matches in the present example with x=5, y=3 and z=3, 27 ambiguities analogous to the 27 above are generated, resulting in a total of $30 \times 27 = 810$ (unique) $3^{rd}$-degree ambiguities or, $$\frac{x!}{(x-z)!z!} \times (2^{z-1} - 1) \times \left(\frac{y(y-1)}{2}\right)^z = 10 \times 3 \times 27 = 810.$$

As noted earlier, the process outlined above can be generalised to allow the number of categories to vary across the criteria. The key difference from the process explained above is that the underlying 'pattern' for each match (for example, abc vs abc with 011 vs 100) is idiosyncratic to the criteria included, as determined by the numbers of categories on each criterion.

For example, if in the example referred to above, instead of three categories on all criteria, criterion a may have two categories, b may have three and c four. Thus with just two categories for criterion a (for 011 vs 100, corresponding to 0___ — vs 1___ —), there is only one underlying pattern $$\left(\frac{y(y-1)}{2} = 2(2-1)/2\right)$$

corresponding to a lower category on the LHS and a higher category on the RHS of each ambiguity that is derived:
a1 vs a2

As before, with three categories for criterion b (corresponding to __1—vs __0—), there are three underlying patterns $$\left(\frac{y(y-1)}{2} = 3(3-1)/2\right)$$

corresponding to a higher category on the LHS and a lower category on the RHS:
b3 vs b2
b3 vs b1
b2 vs b1

Finally, with four categories for criterion c (corresponding to ___1 vs ___0), there are six underlying patterns $$\left(\frac{y(y-1)}{2} = 4(4-1)/2\right)$$

corresponding to a higher category on the LHS and a lower category on the RHS:
c4 vs c3
c4 vs c2
c4 vs c1
c3 vs c2
c3 vs c1
c2 vs c1

By taking all $1 \times 3 \times 6 = 18$ combinations of the above three sets of criteria-categories, all 18 $3^{rd}$-degree ambiguities corresponding to abc vs abc with 011 vs 100 (with two, three and four categories respectively) may be obtained:
a1+b3+c4 vs a2+b2+c3
a1+b3+c4 vs a2+b2+c2
a1+b3+c4 vs a2+b2+c1
a1+b3+c3 vs a2+b2+c2
a1+b3+c3 vs a2+b2+c1
a1+b3+c2 vs a2+b2+c1
a1+b3+c4 vs a2+b1+c3
a1+b3+c4 vs a2+b1+c2
a1+b3+c4 vs a2+b1+c1
a1+b3+c3 vs a2+b1+c2
a1+b3+c3 vs a2+b1+c1
a1+b3+c2 vs a2+b1+c1
a1+b2+c4 vs a2+b1+c3
a1+b2+c4 vs a2+b1+c2
a1+b2+c4 vs a2+b1+c1
a1+b2+c3 vs a2+b1+c2
a1+b2+c3 vs a2+b1+c1
a1+b2+c2 vs a2+b1+c1

This process is performed for all matches. But, because the numbers of categories for the criteria are different, each match generates an idiosyncratic set of ambiguities that depends on the numbers of categories on the included criteria.

For example, the number of ambiguities generated from abc vs abc with 011 vs 100 (as above) is different to the number from abd vs abd with 011 vs 100 when the numbers of categories on criteria c and d are different. Therefore, in general the ambiguities for each of the $$\frac{x!}{(x-z)!z!}$$

bases (combinations of z criteria from the x criteria) must be generated individually.

For example, in the case of the base corresponding to the particular combination of z criteria comprising the first z of the x criteria (criterion 1, criterion 2, . . . criterion z, where $z \leq x$), there are $2^{z-1}-1$ structures as before. (The choice of the first z of the x criteria, instead of any other z of the x criteria, is for notational simplicity.) Each structure has $$\left(\frac{y_1(y_1-1)}{2}\right) \times \left(\frac{y_2(y_2-1)}{2}\right) \times \ldots \times \left(\frac{y_z(y_z-1)}{2}\right)$$

ambiguities, where $y_1, y_2 \ldots y_z$ are the numbers of categories on each of these first z criteria.

The total number of $z^{th}$-degree ambiguities is obtained by summing the number of ambiguities (analogous to the example) across all $$\frac{x!}{(x-z)!z!}$$

bases. In general, the number of ambiguities of each degree can be calculated from the equation described below.

For a given APS with $y_1, y_2, \ldots y_x$ categories on the respective x criteria, the equation is based on the following definitions. First, Y is the set of the numbers of categories on the x criteria: $Y = \{y_1, y_2, \ldots y_x\}$. Second, C is the set of unordered z-tuples formed by taking all possible $$\frac{x!}{(x-z)!z!}$$

combinations of the elements of Y, z-at-a-tine: C={c|c is an unordered z-tuple from Y, as defined above}. Each of C's elements (or sets), $c_i$, is numbered from 1 to $$\frac{x!}{(x-z)!z!}: c_b i = 1, 2, \ldots \frac{x!}{(x-z)!z!}.$$

Each of $c_i$'s elements, $y_{ij}$, is numbered from 1 to z: $y_{ij}$, j=1, 2, ... z.

Applying these definitions, the number of unique ambiguities of a given degree (z), when the number of categories varies across criteria, is given by:

$$(2^{z-1} - 1) \times \sum_{i=1}^{\frac{x!}{(x-z)!z!}} \prod_{j=1}^{z} \frac{y_{ij}(y_{ij} - 1)}{2} \qquad (3)$$

Alternatively this equation can be expressed as:

$$(2^{z-1} - 1) \times \sum_{c \in C} \prod_{y \in c} \frac{y(y-1)}{2}.$$

For common values of $y_{ij}$ ($y_{ij}=y$), that is, all criteria with the same numbers of categories, equation (3) is equivalent to equation (2) above.

Either process explained above—for the same or, alternatively, different numbers of categories on the criteria—can be used to generate all of an APS's ambiguities of a given degree (such as $3^{rd}$-degree, as above), or, alternatively, ambiguities can be generated individually.

As each ambiguity is generated it may be tested for whether or not it is theoretically impossible, and therefore to be discarded or not, given the theoretically impossible profiles that were culled earlier (as described above). For the simple process for generating ambiguities described earlier, all theoretically impossible profiles are simply removed before ambiguities are generated from them.

However, because the 'efficient ambiguities generator' explained immediately above does not generate ambiguities from profiles, the ambiguities must be tested as they are generated for whether or not the profile pairs that they represent have been eliminated.

For example, for an APS with x=4 and y=3, the reduced form a1+b3 vs a3+b2 (i.e., 13____ vs 32____) represents nine ambiguously ranked profile pairs:
 1311 vs 3211
 1312 vs 3212
 1313 vs 3213
 1321 vs 3221
 1322 vs 3222
 1323 vs 3223
 1331 vs 3231
 1332 vs 3232
 1333 vs 3233

For a1+b3 vs a3+b2 to be theoretically impossible and therefore discardable, in all nine of these pairs at least one of the profiles—a minimum of nine and a maximum of 18 profiles—must be theoretically impossible. If instead at least one of the nine pairs is not excluded, then a1+b3 vs a3+b2 is possible and therefore ought not to be discarded. Accordingly all nine pairs must be considered before it can be determined whether a1+b3 vs a3+b2 should be discarded or not, but as soon as one profile pair is found that has not been excluded, the ambiguity should be retained.

Enumerating all such profile pairs for any given ambiguity of degree z is relatively straight-forward, as each profile pair is based on the ambiguity in question, augmented by all possible combinations of the categories on the other x-z criteria. There are therefore $y^{x-z}$ such profile pairs when the number of categories on the criteria (y) is the same.

As noted earlier, the term $y^{x-z}$ appears in equation (1) above—giving the total number of ambiguities (including replicas) of a given degree—but not in the otherwise identical equation (2)—giving the number of unique ambiguities (excluding replicas) of a given degree.

Accordingly $y^{x-z}$ can be interpreted as the number of 'copies' of a particular ambiguity generated by the algorithmically simple process explained earlier. That is, in the example above with x=4 and y=3, each of the $y^{x-z}=3^{4-2}=9$ pairwise profile comparisons generates a1+b3 vs a3+b2 (of which eight are discarded because they are replicas).

Having generated the ambiguities, The next step of the preferred method for fully calibrating an APS (as set out at step 2 in FIG. 11) involves explicitly resolving them, one-at-a-time, while identifying all other ambiguities that are implicitly resolved as corollaries. This step is represented in FIG. 5 at 520.

Any of the unresolved ambiguities of any degree could be selected for explicit resolution during the calibration process, however there tend to be fewer ambiguities to store at lower degrees, and lower degree ambiguities are easier for decision makers to resolve, and so the process starts by resolving the $2^{nd}$-degree ambiguities and then proceeds to resolving successively higher-degree ambiguities. If instead it were desired that the number of decisions be minimised at the expense of the complexity of the decisions, the process should instead start by resolving the highest degree ambiguities and then proceed to resolving successively lower-degree ambiguities.

As ambiguities can only be resolved via value judgements, they must be decided by an individual 'decision maker' or group of 'decision makers', preferably with knowledge of the field in which the particular APS is to be applied. For example, a group of decision makers for a medical APS may comprise a panel of doctors and patients. Hereinafter decision makers (plural) are referred to.

Accordingly the preferences of the decision makers must be probed via a series of questions concerning their pairwise rankings of profiles.

As listed earlier, the ambiguities for the original exemplar APS with x=3 and y=2 are: (1) b2+c1 vs b1+c2, (2) a2+c1 vs a1+c2, (3) a2+b1 vs a1+b2, (4) a2+b2+c1 vs a1+b1+c2, (5) a2+b1+c2 vs a1+b2+c1 and (6) a1+b2+c2 vs a2+b1+c1.

For ambiguity (1) b2+c1 vs b1+c2, for example, the decision makers are asked, in essence: "Given two alternatives that are identical with respect to criterion a, which has the greater priority, _21 or _12?"

If there is more than one decision maker, the process of getting answers to this and subsequent questions can be streamlined by asking decision makers to cast votes (perhaps via email) for the pairwise rankings they favour.

However, in this type of situation the majority voting runs the risks of the well-known voting paradox, whereby, depending on the decision makers' individual rankings of the profiles, the order the ambiguities are voted on can determine the resolutions that are derived. To avoid this possibility, were it likely, the decision makers should instead be required to reach a consensus on their pairwise rankings.

Logically, three mutually exclusive and exhaustive answers to the above question are possible: (1) _21 is strictly preferred to _12 or (2) _12 is strictly preferred to _21 or (3) they are equally preferred (indifference between _21 and _12).

Notationally, these three preferences can be represented as (1) _21>_12 or (2) _12>_21 or (3) _21=_12, corresponding to (1) b2+c1>b1+c2 or (2) b1+c2>b2+c1 or (3) b2+c1=b1+c2 (where, as usual, ">" is "strictly greater than" and "=" is "equal to").

Weak preferences, for example, _21 is at least as preferred as _12 (notationally, _21≧_12), are also a logical possibility. However strict preferences are more useful from a practical perspective.

The decision makers might, quite naturally, protest that their answer to the above question ("Given two alternatives that are identical with respect to criterion a, which has the greater priority, _21 or _12?") depends on whether criterion a is rated '1' or '2' (for both alternatives). Nonetheless, such distinctions are precluded by the internal logic of APSs. If the decision makers will not answer the question as it is posed then, in effect, the APS itself will answer it by default, as the ambiguity will eventually be implicitly resolved by the other explicitly resolved ambiguities chosen by the decision makers.

More specifically, for example, if the decision makers were to decide that 121>112—corresponding to b2+c1>b1+c2—then this implies 221>212, and vice versa. And analogously for b1+c2>b2+c1 and b1+c2=b2+c1.

The key word above is "if", as clearly neither inequality holds intrinsically. Therefore a value judgement is required to resolve ambiguity (1) b2+c1 vs b1+c2: either 121>112 and 221>212 or 112>121 and 212>221 or 121=112 and 221=212. By virtue of the laws of arithmetic, if one inequality or equality holds then the other must too; if one does not then neither does the other. It is impossible to have one half of either proposition without the other.

Accordingly the question above could be rephrased, in essence, as: "Which one of the following three possible rankings of two alternatives do you prefer, (1) 121>112 and 221>212 or (2) 112>121 and 212>221 or (3) 121=112 and 221=212?"

Continuing with the example, suppose that in fact the decision makers resolve ambiguity (1) by choosing _21>_12 (in other words 121>112 and 221>212), corresponding to b2+c1>b1+c2. Two alternative, but equivalent, approaches are available for identifying the implicitly resolved ambiguities.

Although these approaches—hereinafter referred to as 'Approach 1' (of which there are two variants) and 'Approach 2'—differ in the means and the sequence in which the implicitly resolved ambiguities are identified, both generate the same list of explicitly resolved ambiguities, from which the point values are derived at Step 3 described below.

However because Approach 1 becomes relatively unwieldy, and therefore more resource intensive to implement, for more criteria and categories than the exemplar APS with x=3 and y=2, the particularly preferred embodiment of the computer program of the invention is preferably based on Approach 2.

Approach 1 may be summarised as follows. After a given ambiguity is explicitly resolved by the decision makers, all other ambiguities that are implicitly resolved as corollaries are immediately identified by adding appropriate inherent inequalities and/or other explicitly resolved ambiguities (inequalities or equalities). Then another (unresolved) ambiguity is explicitly resolved by the decision makers and all its corollaries are identified. The process is repeated until all ambiguities have been resolved, either explicitly or implicitly.

Thus a corollary of the explicit resolution of ambiguity (1) as b2+c1>b1+c2 (decided by the decision makers, as explained earlier) is the implicit resolution of ambiguity (4) a2+b2+c1 vs a1+b1+c2. This is revealed by adding the inherent inequality a2>a1 and b2+c1>b1+c2: (a2>a1)+(b2+c1>b1+c2)=(a2+b2+c1>a1+b1+c2).

Although this addition is mathematically legitimate, its theoretical validity in the context of APSs rests on the assumption that the decision makers are logically consistent in the sense that their pairwise profile rankings are transitive. Transitivity means in general that if alternatives A>B and B>C, then A>C.

Thus, in the present example, the explicit resolution of ambiguity (1) as b2+c1>b1+c2 corresponds to 121>112 and 221>212, as discussed earlier. Moreover 212>112 because a2>a1. Therefore, assuming profile rankings are transitive, 221>212 and 212>112 implies 221>112—corresponding to a2+b2+c1>a1+b1+c2, as was revealed above by adding a2>a1 and b2+c1>b1+c2.

As there are no other corollaries at this point, the next ambiguity on the list, in this case ambiguity (2) a2+c1 vs a1+c2, can be presented to the decision makers to resolve via an analogous question to the first one: "Given two alternatives that are identical with respect to criterion b, which has the greater priority, 1_2 or 2_1?"

Suppose the decision makers answer 1_2>2_1, corresponding to a1+c2>a2+c1. A corollary is the implicit resolution of ambiguity (6) a1+b2+c2 vs a2+b1+c1, as revealed by adding inherent inequality b2>b1 to a1+c2>a2+c1: (b2>b1)+(a1+c2>a2+c1)=(a1+b2+c2>a2+b1+c1).

In addition, both (1) b2+c1>b1+c2 and (2) a1+c2>a2+c1 implicitly resolve ambiguity (3) a2+b1 vs a1+b2, as revealed by their addition: (b2+c1>b1+c2)+(a1+c2>a2+c1)=(a1+b2>a2+b1) (after cancelling the c terms).

As for the addition of inherent inequalities and explicitly resolved ambiguities (as above), this addition is also justified by the assumption that the pairwise profile rankings of the decision makers are transitive.

Thus, in the present example, the explicit resolution of ambiguity (1) as b2+c1>b1+c2 corresponds to 121>112 and 221>212, and (2) a1+c2>a2+c1 corresponds to 112>211 and 122>221. Given 121>112 and 112>211, then, by transitivity, 121>211 is implied. Likewise, given 122>221 and 221>212, then 122>212 is implied. Both 121>211 and 122>212 correspond to a1+b2>a2+b1, as was revealed above by adding (1) b2+c1>b1+c2 and (2) a1+c2>a2+c1.

Thus from just two explicit decisions to resolve ambiguities (1) and (2), another three ambiguities (3, 4 and 5) are implicitly resolved, so that five of the six ambiguities are resolved.

The remaining ambiguity, ambiguity (5) a2+b1+c2 vs a1+b2+c1, must be explicitly resolved by the decision makers, via a question that is conceptually simpler than the two earlier ones: "Which alternative has the greater priority, 212 or 121?" Suppose the decision makers answer 212>121, corresponding to a2+b1+c2>a1+b2+c1.

The system is now fully specified as: (1) b2+c1>b1+c2, (2) a1+c2>a2+c1, (3) a1+b2>a2+b1, (4) a2+b2+c1>a1+b1+c2, (5) a2+b1+c2>a1+b2+c1 and (6) a1+b2+c2>a2+b1+c1—as well as the inherent inequalities a2>a1, b2>b1 and c2>c1. Of inequalities (1) to (6), only three (1, 2 and 5) were explicitly resolved by the decision makers, with the other three (3, 4 and 6) implicitly resolved as corollaries.

With respect to the restricted group of Alternatives 1 to 4 in the example mentioned earlier, corresponding to three $2^{nd}$-degree ambiguities and one $3^{rd}$-degree ambiguity, the fully specified system is: (1) $b2+c1>b1+c2$, (2) $a1+c2>a2+c1$, (3) $a1+b2>a2+b1$ and (6) $a1+b2+c2>a2+b1+c1$—as well as the inherent inequalities $a2>a1$, $b2>b1$ and $c2>c1$. These inequalities are arrived at (decided by the decision makers) via the same process as explained above for fully calibrating the APS, except that only inequalities (1) and (2) must be explicitly resolved by the decision makers, with the other two (3 and 6) implicitly resolved as corollaries.

Finally, in general but not in the present example, any explicitly resolved ambiguities that are themselves corollaries of other explicitly resolved ambiguities can be removed from the list from which the point values are derived at Step 3 (below). This is because only independent inequalities/equalities are required for deriving point values.

A variant of the approach outlined above—in effect, its converse—is the identification of the sufficient (but not necessary) conditions for implicitly resolving ambiguities, in terms of (other) resolved ambiguities. Ambiguities are either explicitly resolved by the decision makers or implicitly resolved when their sufficient conditions are met. Any ambiguities whose sufficient conditions are not met must therefore be resolved explicitly by the decision makers, until all ambiguities have been resolved, either explicitly or implicitly.

Thus in the exemplar APS with $x=3$ and $y=2$, ambiguities (4), (5) and (6) have four sufficient conditions each in terms of resolved $2^{nd}$-degree ambiguities. Specifically, ambiguity (4) is (implicitly) resolved as $a2+b2+c1>a1+b1+c2$ if at least one of the following inequalities holds: $a2+c1>a1+c2$ or $a2+c1=a1+c2$ (in both cases because $b2>b1$) or $b2+c1>b1+c2$ or $b2+c1=b1+c2$ (in both cases because $a2>a1$).

These and analogous sufficient (but not necessary) conditions for ambiguities (5) and (6) to be implicitly resolved as $a2+b1+c2>a1+b2+c1$ and $a1+b2+c2>a2+b1+c1$ respectively are listed in FIG. 10. No sufficient conditions exist for the opposite resolutions of the three ambiguities nor for equalities (that is, not for RHS>LHS nor LHS=RHS) in terms of resolved $2^{nd}$-degree ambiguities.

It is then simply a matter of comparing these conditions against resolved ambiguities (1), (2) and (3) (arrived at via Approach 1 explained above). Accordingly, as identified via shading in FIG. 10, (1) $b2+c1>b1+c2$ implicitly resolves ambiguity (4) as $a2+b2+c1>a1+b1+c2$, and both (2) $a1+c2>a2+c1$ and (3) $a1+b2>a2+b1$ implicitly resolve ambiguity (6) as $a1+b2+c2>a2+b1+c1$.

These are the same $3^{rd}$-degree resolutions as were revealed earlier via the explicit resolutions of ambiguities (1) and (2) and their additions to inherent inequalities and each other respectively. As such they reflect, as before, pairwise profile rankings that are transitive.

Finally, as before, ambiguity (5) remains to be explicitly resolved, and then the system is fully specified.

This variant of Approach 1 generalises for APSs with higher-degree ambiguities. Their sufficient conditions are in terms of both individual lower-degree resolved ambiguities and combinations of them, of which there may be many. For example, the sufficient conditions for the resolution of a $5^{th}$-degree ambiguity are in terms of combinations of $2^{nd}$-degree resolved ambiguities, $3^{rd}$-degree resolved ambiguities and $4^{th}$-degree resolved ambiguities.

However, sufficient conditions for an ambiguity of a given degree can also be identified in terms of resolved ambiguities of the same, or even higher, degrees. In the present example, sufficient conditions can also be identified for resolving $2^{nd}$-degree ambiguities in terms of other resolved $2^{nd}$-degree ambiguities. For example, a sufficient condition for resolving ambiguity (3) $a2+b1$ vs $a1+b2$ as $a1+b2>a2+b1$ is (1) $b2+c1>b1+c2$ and (2) $a1+c2>a2+c1$, corresponding to $(b2+c1>b1+c2)+(a1+c2>a2+c1)$, as explained earlier.

This means that in general it is difficult to enumerate and check all possible sufficient conditions (to ensure that none are missed). Therefore, this variant may be supplemented by other methods, such as the first variant of Approach 1 explained above.

Finally, with respect to both variants of Approach 1, because ambiguities (1) to (3) are not independent, both the order and the manner in which they are resolved affects the number of explicit value judgements that are required. The maximum number of explicit rankings required is four and the minimum is two.

For example, if inequality (3) had been decided before inequalities (1) and (2) (instead of after, as above), then all three ambiguities (as well as ambiguity 5) would have had to have been resolved explicitly. This is because inequality (3) $a1+b2>a2+b1$ cannot be added to (1) $b2+c1>b1+c2$ or (2) $a1+c2>a2+c1$ to obtain the other inequality, and yet inequalities (1) and (2) imply (3). For ambiguities (4) to (6), on the other hand, one and only one must be resolved explicitly.

Alternatively, for example, had ambiguity (1) been resolved as $b2+c1=b1+c2$ instead of $b2+c1>b1+c2$ (indifference rather than strict preference), and ambiguity (2) resolved as $a1+c2>a2+c1$ (as above), then no other explicit resolutions would have been necessary.

This can be confirmed by noting that (1) $b2+c1=b1+c2$ implies both (4) $a2+b2+c1>a1+b1+c2$ and (5) $a2+b1+c2>a1+b2+c1$. In other words $(b2+c1=b1+c2)+(b2>b1)$ for both of them and (2) $a1+c2>a2+c1$ implies (6) $a1+b2+c2>a2+b1+c1$ (as above) and $(b2+c1=b1+c2)+(a1+c2>a2+c1)$ implies (3) $a1+b2>a2+b1$. Clearly, the point values derived from this system of equations and inequalities would be different to the point values derived earlier.

Similarly the system would be completely specified by the explicit resolution of ambiguities (1) and (6) as $b1+c2>b2+c1$ and $a2+b1+c1>a1+b2+c2$ only. Of particular interest is: $(a2+b1+c1>a1+b2+c2)+(b2>b1)=(2)$ $(a2+c1>a1+c2)$; and $(a2+b1+c1>a1+b2+c2)+(c2>c1)=(3)$ $(a2+b1>a1+b2)$. This illustrates the fact that it is not necessary to resolve lower-degree (here $2^{nd}$-degree) ambiguities before implicitly resolving higher-degree (here $3^{rd}$-degree) ambiguities. The process can be reversed, as illustrated here.

The 'additions' variant of Approach 1 involves maintaining a list of all possible inequalities/equalities that result from the addition of each explicitly resolved ambiguity with each other explicitly resolved ambiguity as well as with the inherent inequalities, and with every sum generated, and each of these sums with each other recursively until all possible additive combinations are exhausted. Each newly generated ambiguity is 'checked off' against the list of implicitly resolved ambiguities: if it is not on the list then it is yet to be resolved.

Similarly, the 'sufficient conditions' variant of Approach 1 involves managing a list of all implicitly resolved ambiguities, identifying all possible sufficient conditions of lower degrees, of which there may be a great many combinations, and identifying ambiguities implied by the same or higher degree explicitly resolved ambiguities (by some other means).

Approach 2, on the other hand, which is explained below, is more efficient and is therefore the preferred method for fully calibrating APSs, and also for ranking a restricted group of alternatives or choosing the 'best' alternative from the group, used in the computer program of the invention.

In summary, Approach 2 involves testing ambiguities individually for whether or not they are implicitly resolved as corollaries of the explicitly resolved ambiguities (that were resolved earlier). If a given ambiguity is identified as having been implicitly resolved then it is deleted. If instead it is not implicitly resolved then it must be explicitly resolved by the decision makers. The process is repeated until all ambiguities have been identified as having been implicitly resolved or they are explicitly resolved.

Thus, with reference to the exemplar APS with x=3 and y=2, after the decision makers resolve ambiguity (1) as $b2+c1>b1+c2$ as described earlier, the next ambiguity on the list ((2) $a1+c2$ vs $a2+c1$) is tested for whether or not it is implicitly resolved as a corollary of $b2+c1>b1+c2$, as well as the inherent inequalities $a2>a1$, $b2>b1$ and $c2>c1$.

Here, as in the computer program of the invention, this and subsequent tests can be performed via linear programming. In effect, this test is performed by asking the following two hypothetical questions (of the method, not the decision makers).

Hypothetical Question 1: If it were the case that the ambiguity in question [here (2) $a1+c2$ vs $a2+c1$] had been implicitly resolved as LHS>RHS (i.e., $a1+c2>a2+c1$), then does a solution exist to the system comprising this hypothetical inequality and the (actual) explicitly resolved inequalities/equalities [here (1) $b2+c1>b1+c2$]—as well as the inherent inequalities [here $a2>a1$, $b2>b1$ and $c2>c1$]? (Yes or No?)

If the answer is No—and therefore it would not be theoretically possible for the decision makers, if they wanted to, to explicitly resolve the ambiguity in question as LHS>RHS (here $a1+c2>a2+c1$)—then it must be true that either RHS>LHS or LHS=RHS (i.e., either $a2+c1>a1+c2$ or $a1+c2=a2+c1$). This implies that the ambiguity in question (here ambiguity 2) has been implicitly resolved (i.e., as either $a2+c1>a1+c2$ or $a1+c2=a2+c1$). Hence it is of no further use and can be deleted.

If instead the answer to Question 1 is Yes—and therefore it would be theoretically possible for the decision makers, if they wanted to, to explicitly decide LHS>RHS (here $a1+c2>a2+c1$)—then the following second hypothetical question is asked.

Hypothetical Question 2: If it were instead the case that the ambiguity in question (here ambiguity 2) had been implicitly resolved as RHS>LHS (that is, $a2+c1>a1+c2$), then does a solution exist to the system comprising this hypothetical inequality and the (actual) explicitly resolved inequalities/equalities [here (1) $b2+c1>b1+c2$, as before]—as well as the inherent inequalities [here $a2>a1$, $b2>b1$ and $c2>c1$]? (Yes or No?)

If the answer is No—and therefore it would not be theoretically possible for the decision makers, if they wanted to, to explicitly resolve the ambiguity in question as RHS>LHS (here $a2+c1>a1+c2$)—then it must be true that either LHS>RHS or LHS=RHS (either $a1+c2>a2+c1$ or $a1+c2=a2+c1$). This implies that the ambiguity in question (here ambiguity 2) has been implicitly resolved, in this case as $a1+c2>a2+c1$ or $a1+c2=a2+c1$. Hence it is of no further use and can be discarded.

If instead the answer to Question 2 is Yes then it must be inferred that as well as it being theoretically possible for the decision makers, if they wanted to, to explicitly resolve the ambiguity in question as LHS>RHS (here $a1+c2>a2+c1$) from Question 1 that it is also theoretically possible for them to resolve it as RHS>LHS ($a2+c1>a1+c2$). This implies that the ambiguity in question (here ambiguity 2) is not implicitly resolved as a corollary of the explicitly resolved ambiguities, and therefore it must be explicitly resolved by the decision makers.

In the case of ambiguity (2) $a1+c2$ vs $a2+c1$ the answers to Questions 1 and 2 are Yes and Yes, and so the ambiguity should be presented to the decision makers for them to explicitly resolve. As for the earlier demonstration of Approach 1, suppose it is decided $a1+c2>a2+c1$.

The next ambiguity on the list—(3) $a2+b1$ vs $a1+b2$—is then tested via the same process as outlined above. This time, though, the list of (actual) explicitly resolved inequalities/equalities against which (3) $a2+b1>a1+b2$ (i.e., LHS>RHS, as for Question 1) and then, if necessary, (3) $a1+b2>a2+b1$ (RHS>LHS, as for Question 2) are tested comprises (2) $a1+c2>a2+c1$ as well as (1) $b2+c1>b1+c2$ (as before).

Thus the list of explicitly resolved inequalities/equalities is continually updated—including in general but not in the present example, as for Approach 1, the identification of any explicitly resolved inequalities/equalities that are themselves corollaries of others on the list.

The process is repeated for all ambiguities until all of them have been identified as having been implicitly resolved or they are explicitly resolved by the decision makers. This can be summarised for the present example as follows.

For ambiguity (3) the answer to Question 1 is No, and therefore this ambiguity is identified as having been implicitly resolved as a corollary of the explicitly resolved ambiguities. For ambiguity (4), the answer to Question 1 is Yes but the answer to Question 2 is No, and therefore this ambiguity is identified as having been implicitly resolved.

For ambiguity (5) the answers to both questions are Yes, implying that this ambiguity has not been implicitly resolved, and so it must be explicitly resolved by the decision makers: as $a2+b1+c2>a1+b2+c1$, as for the demonstration of Approach 1. Finally, for ambiguity (6) the answers are Yes and No, and therefore this ambiguity is also identified as having been implicitly resolved.

Thus, of the six ambiguities, three had to be explicitly resolved by the decision makers—(1) $b2+c1>b1+c2$, (2) $a1+c2>a2+c1$ and (5) $a2+b1+c2>a1+b2+c1$ (the same three as for Approach 1)—with the other three (3, 4 and 6) were identified as having been implicitly resolved as corollaries.

The final step of the method (Step 3) of the invention involves simultaneously solving the system of (independent) explicitly resolved ambiguities (inequalities and equalities) and inherent inequalities to obtain the point values and/or a ranking of the restricted group of alternatives or the identification of the 'best' one. This step of the method is represented in FIG. 5 at 530.

As described above, any explicitly resolved ambiguities that are themselves corollaries of other explicitly decided inequalities are removed, because only independent inequalities/equalities are required for deriving the point values.

For the example of fully calibrating an APS with x=3 and y=2, one solution for (1) $b2+c1>b1+c2$, (2) $a1+c2>a2+c1$ and (5) $a2+b1+c2>a1+b2+c1$ and $a2>a1$, $b2>b1$ and $c2>c1$ is: $a1=0$, $a2=2$, $b1=0$, $b2=4$, $c1=0$ and $c2=3$. These point values produce ranking #9 in FIG. 4.

Similarly, with respect to the restricted group of Alternatives 1 to 4 in the example mentioned earlier, these point values produce the ranking: 122 (first), 221, 212 and 211 (last).

The process for ranking a restricted group of alternatives or choosing the 'best' alternative from the group is now discussed in more detail. It is preferable to integrate it with the process for fully calibrating an APS, as described above, as the ranking of the restricted group or identification of the 'best' alternative may occur before the APS is fully calibrated.

After the restricted group of alternatives is specified by the decision makers, the ambiguities for these alternatives are generated using the 'simple method for generating ambiguities' described above. In essence, this involves pairwise comparisons of alternatives and the cancellation of variables common to both alternatives.

When these ambiguities are resolved by the decision makers, the restricted group of alternatives will have been ranked such that any further decisions made for the purpose of fully calibrating an APS will not affect the ranking of the restricted group of alternatives. These ambiguities for the restricted group of alternatives are tested for resolution whenever the decision makers explicitly resolves an ambiguity in the same manner as for the other ambiguities, as described above.

However, the 'best' or top-ranked alternative may be able to be determined before the restricted group of alternatives is ranked. There are two possible approaches to this, which are referred to below as Approach 3 and Approach 4. They are now explained in turn.

For Approach 3, as the decision makers explicitly resolve ambiguities, each alternative is compared with every other to determine whether it would be infeasible for it to be ranked below the other alternatives, given the explicitly resolved ambiguities and the inherent inequalities. This test is analogous to that described earlier in terms of Hypothetical Questions 1 and 2 of Approach 2 above, as is now illustrated in the present context.

Hypothetical Question 1: Does a solution exist to the system comprising the (actual) explicitly resolved inequalities/equalities as well as the inherent inequalities and the proposition that 'Alternative A'$\geq$'Alternative B'. If the answer is No, and therefore it would not be theoretically possible for 'Alternative A' to be ranked above or equal to 'Alternative B', then it must be true that 'Alternative A' is ranked below 'Alternative B'. Hence 'Alternative B' is not a 'best' alternative.

If instead the answer to Question 1 is Yes, and therefore it would be theoretically possible for 'Alternative A' to be ranked above or equal to 'Alternative B', then the following second hypothetical question is asked.

Hypothetical Question 2: Does a solution exist to the system comprising the (actual) explicitly resolved inequalities/equalities as well as the inherent inequalities and the proposition that 'Alternative B'$\geq$'Alternative A'. If the answer is No, and therefore it would not be theoretically possible for 'Alternative B' to be ranked above or equal to 'Alternative A', then it must be true that 'Alternative B' is ranked below 'Alternative A'. Hence 'Alternative B' is not a 'best' alternative.

If instead the answer to Question 2 is Yes, and therefore it would be theoretically possible for 'Alternative A' to be ranked above or equal to 'Alternative B', then the relationship between these two alternatives is either not yet known or they are equal.

After all the alternatives have been compared with each other, a final test is performed among those alternatives that have not been identified as not being a 'best' alternative.

These potentially 'best' alternatives are pairwise compared with every other to determine if it is possible that they are not equal, in a fashion analogous to the above (if it is possible that 'Alternative A'<'Alternative B', or that 'Alternative B'<'Alternative A'). If it is possible that these potentially 'best' alternatives are not equal then there is no clearly 'best' alternative.

If instead all the potentially 'best' alternatives are found to be equally ranked, or if there is only one, the highest ranking alternative or alternatives will not change with further resolution of ambiguities, and if finding the 'best' alternative is the objective, the process can stop before the APS is fully calibrated.

An alternative approach, known as Approach 4, to finding the 'best' alternative that extends more easily to finding the best t alternatives among the restricted group of alternatives is as follows.

First, a solution to the system of inherent inequalities and resolved ambiguities is found, resulting in a set of points values for each category. Second, these points values are used to score each alternative in the restricted group of alternatives. Third, the group is sorted by each alternative's score. Fourth, the unresolved ambiguities representing an ambiguity involving any of the top t alternatives (the t alternatives with the highest scores) and the other alternatives are sought.

If no such ambiguities are found, the top t alternatives are ranked ahead of the other alternatives. This relationship between the top t alternatives and the other alternatives will not change with further resolution of ambiguities and so the 'best' t alternatives have been found. If finding the 'best' t alternatives is the objective, the process can stop before the APS is fully calibrated.

Fifth, if the 'best' t alternatives were found, the unresolved ambiguities representing ambiguities involving alternatives in the top t alternatives are identified. If no such ambiguities are found, the best t alternatives are also ranked among each other, and this relationship will not change with further resolution of ambiguities. If finding the 'best' t alternatives and ranking these t alternatives is the objective, the process can stop before the APS is fully calibrated.

The overall method explained above may be broadly summarised as follows. First, generate the ambiguities of the APS that is to be calibrated and/or the ambiguities of the restricted group of alternatives that are to be ranked or the 'best' chosen as shown at 510 in FIG. 5.

Then explicitly resolve the ambiguities via the value judgements of the consulted decision makers, while identifying all other ambiguities that are implicitly resolved as corollaries, until all ambiguities are resolved. This step is illustrated at 520 in FIG. 5. Although, in theory, the implicitly resolved ambiguities can be identified via Approach 1 or Approach 2 (both explained above), the latter is more efficient and therefore it is the particularly preferred method for the computer program of the invention, as explained below.

Finally, simultaneously solve the system of explicitly resolved ambiguities (that is, inequalities and equalities) and inherent inequalities to obtain the point values for the APS and/or a ranking of the restricted group of alternatives or the identification of the 'best' one. This step is illustrated at 530 in FIG. 5. Although, in theory, the 'best' or top-ranked alternative can be identified via Approach 3 or Approach 4 (both explained above), the latter is more efficient and therefore it is the particularly preferred method for the computer program of the invention, as explained below.

The property (assumption) that the profile rankings of the decision makers are transitive (or logically consistent), enables the number of ambiguities that must be explicitly resolved at 520 to be minimised, with the remainder emerging implicitly as corollaries.

For APSs with more criteria and categories than the exemplar with x=3 and y=2, minimising the number of explicitly resolved ambiguities, and accordingly the number of value judgements required from the decision makers, is a significant practical advantage of our method.

Figure 11:
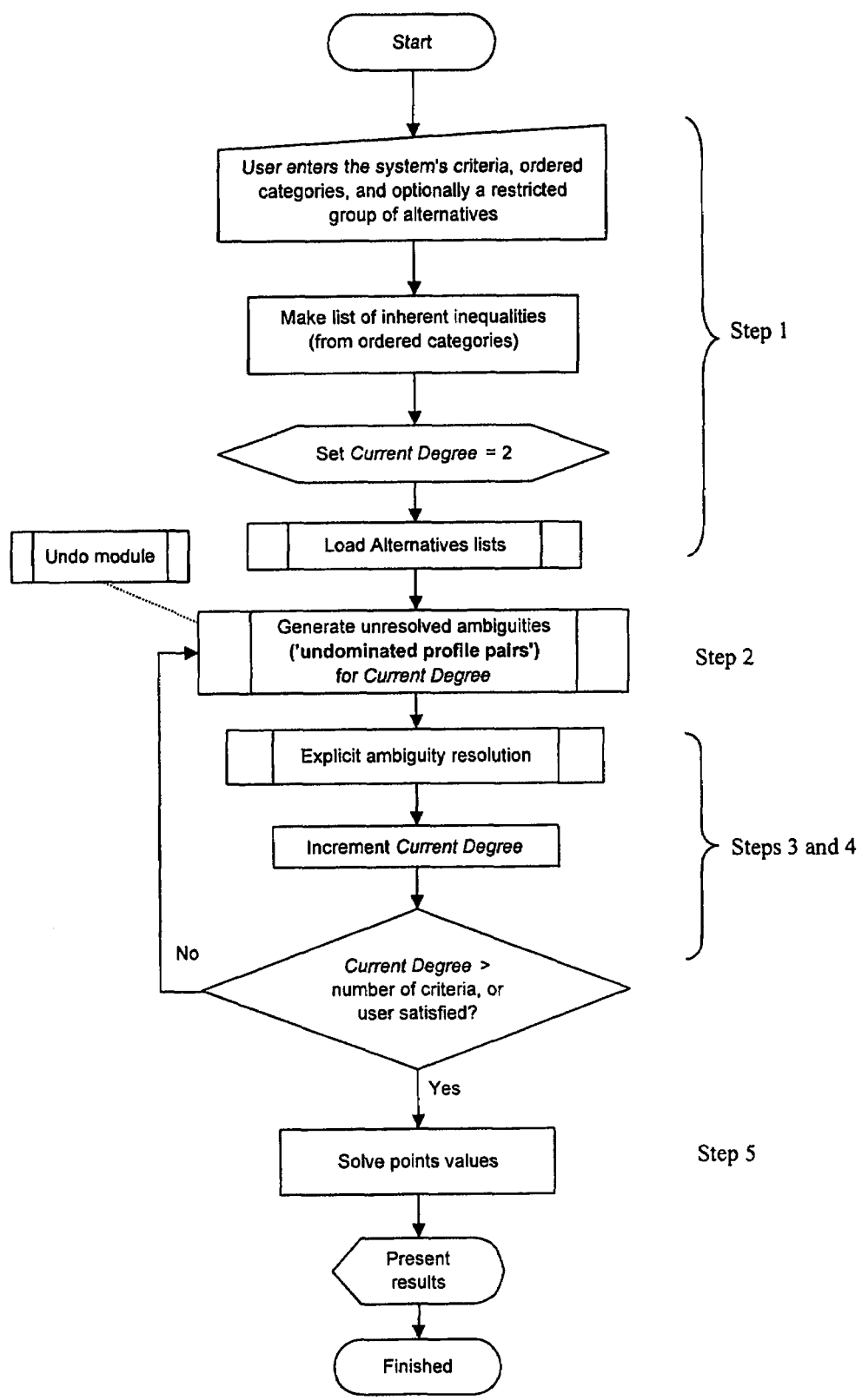
FIG. 11 is a flow diagram illustrating one preferred form for carrying out the invention.

A preferred computer program for implementing the method described above will now be described more particularly. The computer program of the invention comprises, in broad terms, five steps, as explained in turn below. An overview of the five steps is illustrated in FIG. 11. The computer program also includes several features that arise from, but are supplementary to, the method described above.

Before starting the program, the user—who may be one of the decision makers consulted to resolve the ambiguities, or, alternatively, he or she may be a facilitator of the calibration process—must have chosen the criteria and categories of the APS that is to be calibrated and must have ranked each criterion's categories.

At Step 1, when the program begins, the user may be asked to enter a title for the APS and the criteria and their categories, and to rank the categories for each criterion.

Typically this would be achieved via a user interface and user input/output devices and the data received stored to data memory for later processing. The criteria and categories must be labelled in terms of the variables (e.g. 'a1', 'a2' 'a3', etc.) and verbally described in preparation for their later presentation to the decision makers.

The user is also given the opportunity of listing theoretically impossible combinations of criteria and categories that partially or fully specify profiles—known as the To Be Excluded list—and that are therefore to be used to cull ambiguities that are generated by the program. This list may be left empty if the user wishes.

The To Be Excluded list may also include alternatives that are regarded by the user as effectively irrelevant to the decision situation. Such 'irrelevant alternatives' could include ones that, regardless of the outcome of the APS calibration exercise, will always be dominated by the 'relevant alternatives' that, because only they (the relevant alternatives) will be practically affected by the overall ranking produced, are the focus of the user. For example, when patients are being ranked for treatment, if only those in the top portion of the ranking will receive the treatment, then those in the bottom portion are effectively irrelevant.

Irrelevant alternatives are easily identified by the computer program calculating for each theoretically possible alternative the number of alternatives that are unambiguously ranked above it (in other words, that dominate the alternative). This statistic (denoted below by d) for each alternative is the product across all criteria of the difference for each criterion between the lowest-ranked possible category and the actual category for the alternative plus one, minus one (from the product).

Thus the highest possible rank for a given alternative is d+1. If the user's focus is the top c ranked alternatives, then all alternatives for which $d \geqq c$ can be excluded and the remaining alternatives scored. The user is given the opportunity of specifying c, thereby identifying irrelevant alternatives to be on the To Be Excluded list.

The user is also given the opportunity of specifying a restricted group of alternatives in terms of combinations of criteria and categories that are to be ranked and/or the 'best' chosen—known as the Loaded Alternatives list. This list may be left empty if the user wishes.

After the program is initialised, using equation (3) above it calculates the number of unique ambiguities to be resolved to fully calibrate the APS. This can be reported to the user and used to estimate whether the system can be solved in an acceptable amount of time given the computing resources that are available.

The user is also given the opportunity of estimating the number of decisions that will be required to fully calibrate the APS by instructing the program to simulate the calibration process that is described in detail below. This number of decisions depends on the numbers of criteria and categories specified by the user. It also depends on the ambiguities explicitly resolved by the user and whether the user wishes to fully or partially calibrate the APS.

The program simulates the user's overall rankings of all possible alternatives that are represented by the criteria and categories by (repeatedly) randomly drawing the point values and ranking the alternatives by their overall value scores. Equipped thus with simulated overall rankings of alternatives and hence pairwise rankings, the computer program explained below is simulated and the number of decisions required to fully calibrate the APS, or to resolve all ambiguities up to a given degree, is counted. These statistics are available to the user and can be used to estimate the amount of effort required of him or her to calibrate the APS.

Figure 16:
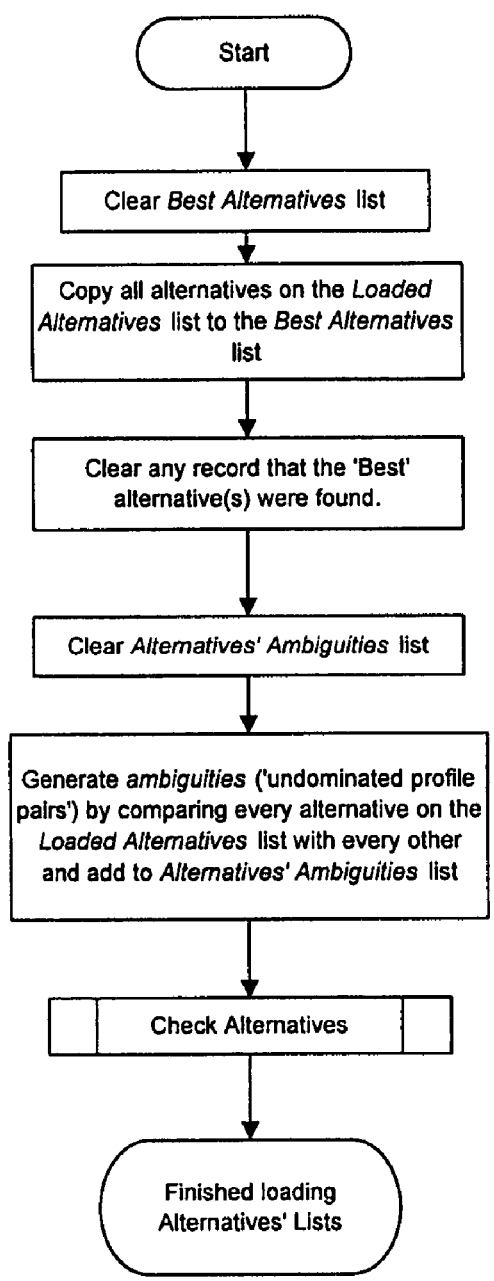
FIG. 16 is a flow diagram illustrating preferred steps for a further preferred aspect of the invention.

The ambiguities for the restricted group of alternatives on the Loaded Alternatives list are generated using the 'simple method for generating ambiguities' described above. In essence, this involves pairwise comparisons of alternatives and the cancellation of variables common to both alternatives. These ambiguities are placed on the Alternatives' Ambiguities list, which is used to determine if the restricted group of alternatives has been ranked such that further decisions will not affect the ranking. Furthermore, all alternatives on the Loaded Alternatives list are placed on the Best Alternatives list, which is used to determine whether the best alternative (or alternatives) have been determined such that further decisions will not affect their top (or top equal) ranking. These steps are illustrated in FIG. 16. The process for managing these lists will be discussed later below.

Figure 12:
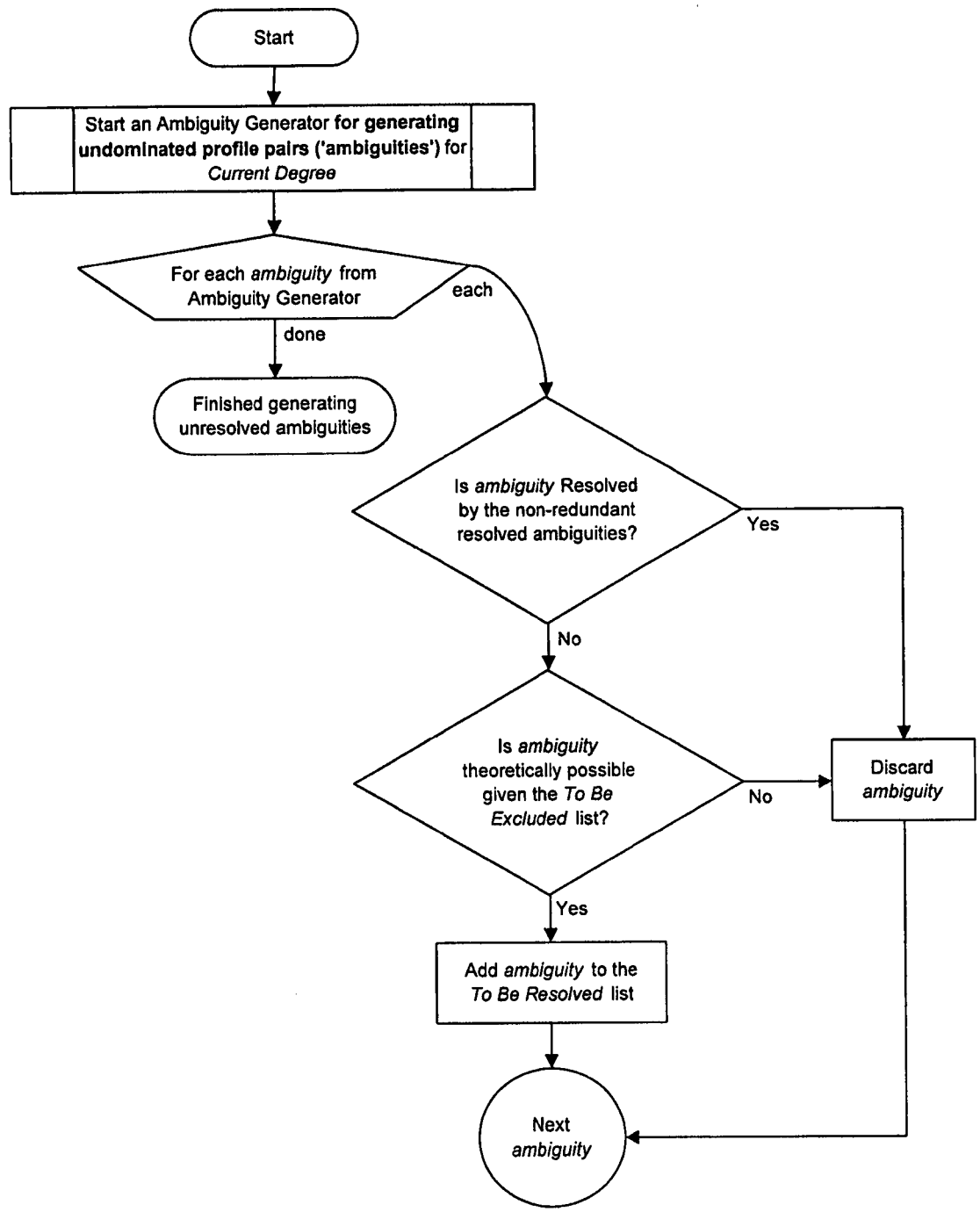
FIG. 12 is a flow diagram illustrating steps for a preferred form ambiguity generator for generating undominated profile pairs for the invention.

Step 2 of the program involves generating the ambiguities for the APS using the 'efficient ambiguities generator' described earlier. An overview of this step is illustrated in FIG. 12.

For simplicity and efficiency, ambiguities are generated for the APS by the efficient ambiguities generator one degree at a time, beginning with the $2^{nd}$-degree, as determined by the value of a control variable—known as the Current Degree variable (see FIG. 11)—which is initially set to 2.

Figure 13:
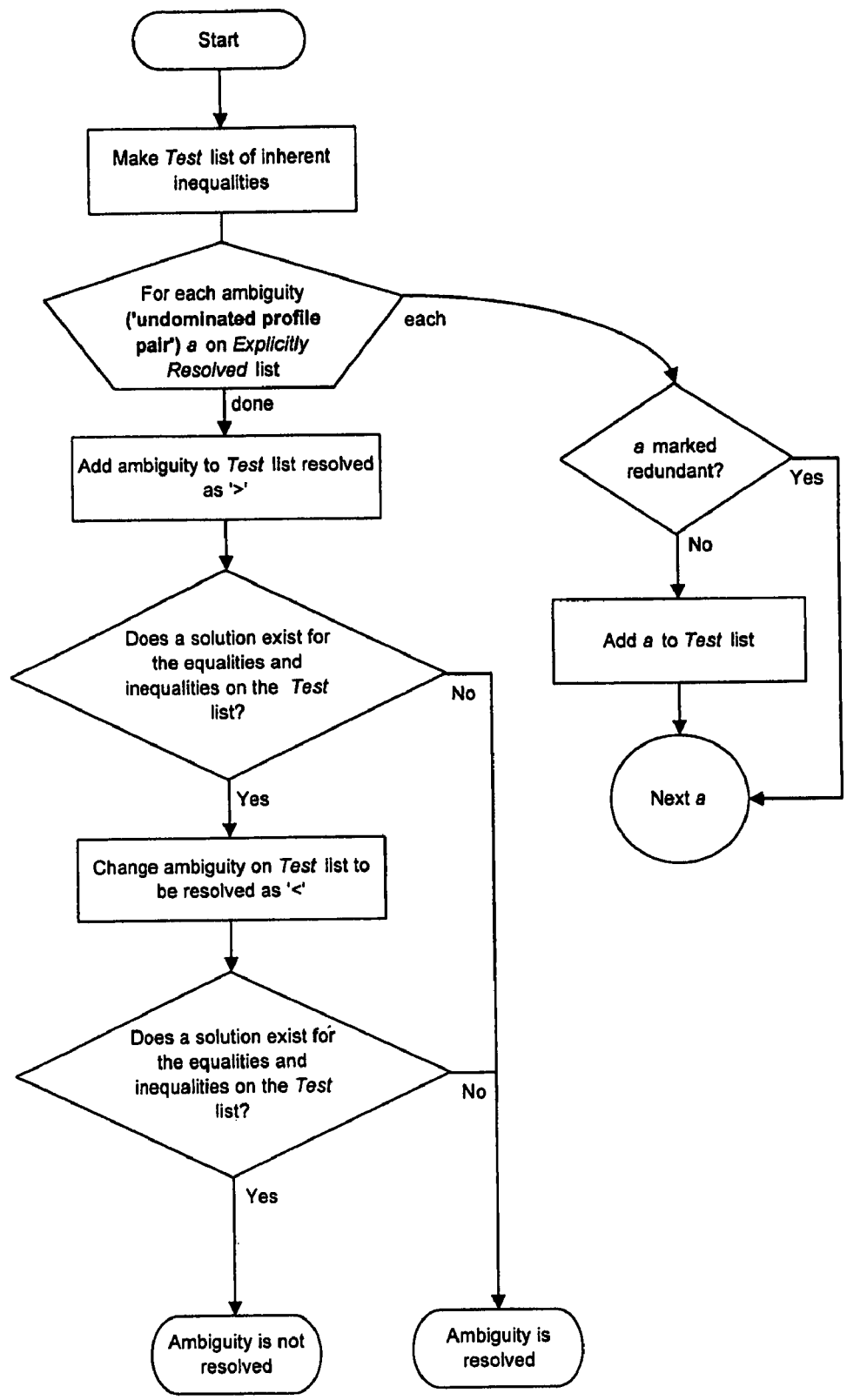
FIG. 13 is a flow diagram illustrating preferred steps for testing whether or not an ambiguity ('undominated profile pairs')is resolved by identifying profile pairs that are implicitly ordinally pairwise ranked as corollaries of ordinal pairwise rankings performed for the invention.

As each ambiguity is generated it is checked for whether or not it is theoretically possible, given the To Be Excluded list of partially or fully specified profiles. If the ambiguity is theoretically possible it is then tested via Approach 2 of Step 2 of the method of the invention explained earlier for whether or not it is implicitly resolved by the explicitly resolved ambiguities. An overview of the procedure is illustrated in FIG. 13. Note though that the Test list generated in FIG. 13 need only be generated once for each batch of ambiguities being tested.

This and similar tests may be performed via linear programming, which is described below. It will, however, be appreciated by those skilled in the art that the methodology of the invention may be implemented using any appropriate programming method.

If an ambiguity is found to be implicitly resolved then it is discarded; otherwise it is added to a list known as the To Be Resolved list. (Note that when the $2^{nd}$-degree ambiguities are generated, none will be implicitly resolved because none have yet been explicitly resolved.)

Figure 14:
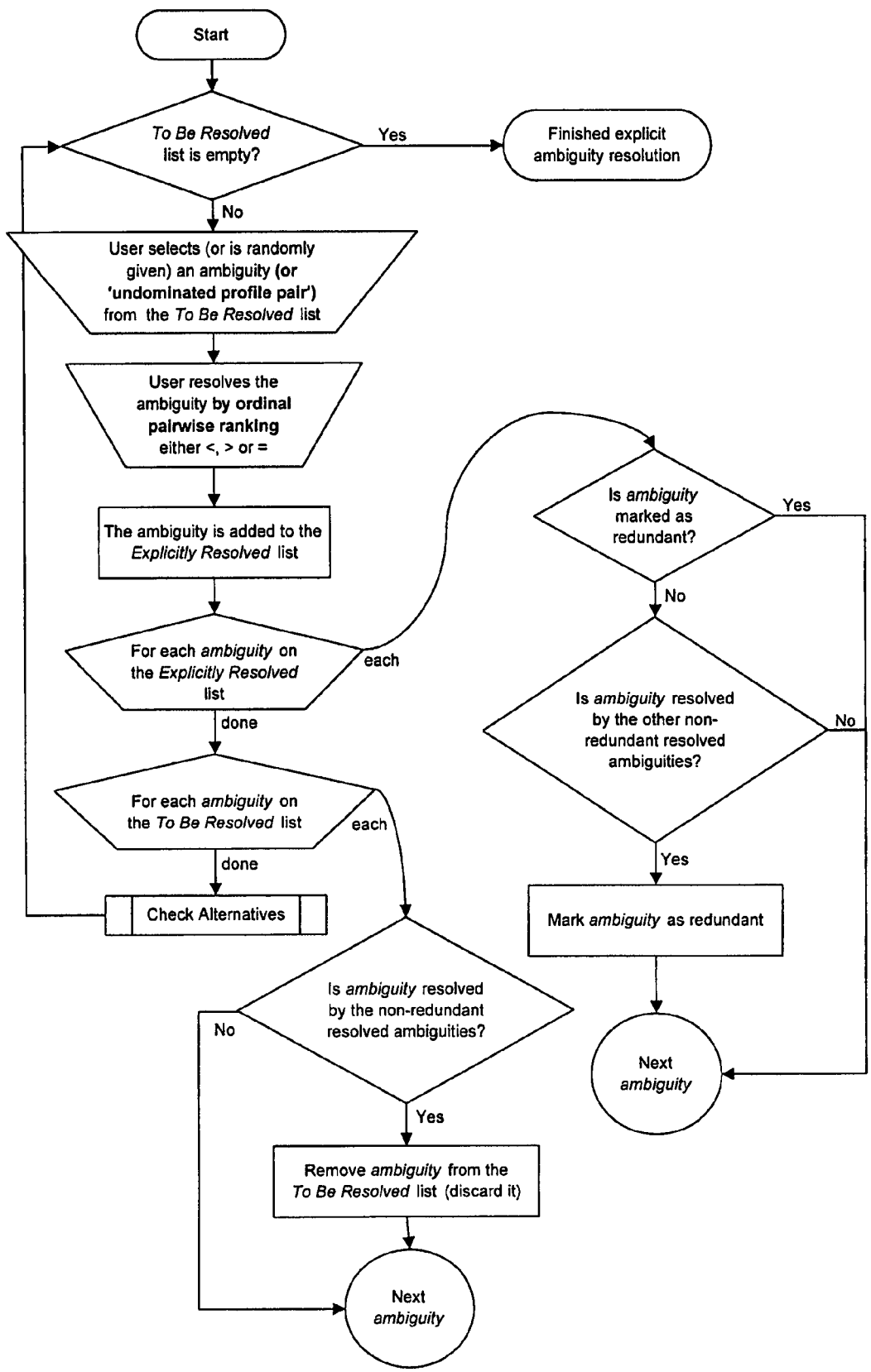
FIG. 14 is a flow diagram illustrating preferred steps for the explicit resolution of ambiguities by ordinal pairwise ranking of profiles for the invention.

Step 3 of the program is to present the To Be Resolved list of unresolved ambiguities for the current degree to the user. An overview of this step and Step 4 (explained below) is illustrated in FIG. 14.

The user can choose to view the ambiguities either in equation form (for example, a1+b2 vs a4+b1) or symbolically (for example, 21____ or 41____), which are ordered either randomly or by their criteria and categories. The user is invited to select an ambiguity for the purpose of explicitly resolving it. The selected ambiguity is 'translated' verbally in terms of the criteria and category descriptions.

If the user desires, he or she may skip this particular ambiguity and select another one, or she may resolve it by clicking one of three buttons labelled (in essence): "LHS greater" or "RHS greater" (i.e., < or RHS preferred) or "LHS and RHS equal". If "RHS greater (preferred)" is chosen, for consistency, the LHS and RHS of the resolved ambiguity are switched and stored as RHS>LHS.

Alternatively, the user may indicate that one or both of the alternatives is theoretically impossible and this is then added to the To Be Exchded list. Any ambiguities on the To Be Resolved list matching a new impossible alternative may be deleted.

The system can also permit weak inequalities (such as "LHS greater than or equal to" and "RHS greater than or equal to"), however this means that some ambiguities will later be partially (weakly) solved and so some buttons in the user interface must be disabled when the ambiguity is selected. Note that in any resulting APS the result will be either "greater than" or it will be "equal to" but it will not be both. The system can also be designed so that only strong inequalities and no equalities are permitted, thereby producing strict profile rankings only.

Step 4 is for the program to remove the explicitly resolved ambiguity (as above) from the To Be Resolved list and add it—as either an inequality or equality (depending on how the ambiguity was resolved)—to the list of explicitly resolved ambiguities, known as the Explicitly Resolved list. An overview of this step and Step 3 is illustrated as FIG. 14.

Each inequality/equality on the Explicitly Resolved list is then tested as to whether or not it is implied by the others on the list. Any found to be implied may be marked as being 'redundant' and hereinafter ignored, but they are not deleted because they may be re-used later if any explicitly resolved ambiguities are later revised by the decision makers (explained below).

All ambiguities on the To Be Resolved list are then tested for whether or not their resolution is implied by the (non-redundant) inequalities/equalities on the Explicitly Resolved list, and if so they are deleted from the To Be Resolved list. This test was explained earlier in terms of Hypothetical Questions 1 and 2 of Approach 2 of the method's Step 2 and is illustrated in FIG. 13.

In essence, the test involves finding whether or not a solution (in terms of feasible point values) exists to a system comprising the explicitly resolved inequalities/equalities and inherent inequalities, and each of the possible hypothetical inequalities in turn (that is LHS>RHS and RHS>LHS) corresponding to the ambiguity in question. This and the earlier tests based on determining the existence of solutions are performed via linear programming (LP) with inequality and equality constraints. LP is discussed in more detail in the final section below.

Figure 17:
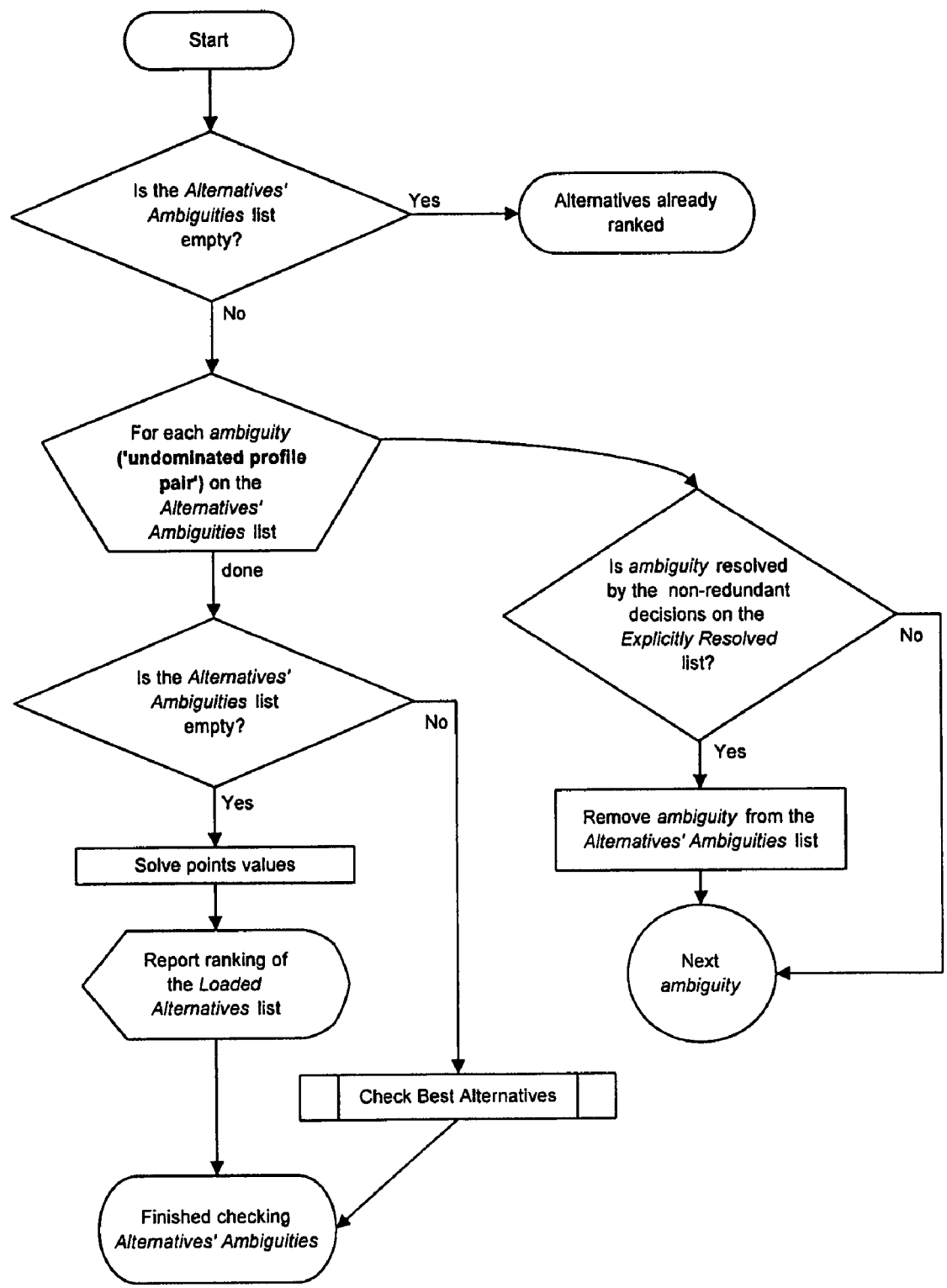
FIG. 17 is a flow diagram illustrating preferred steps for determining whether a restricted group of alternatives has been ranked.

Next, the ambiguities on the Alternatives' Ambiguities list are tested and removed in the same way as the To Be Resolved list, as referred to in FIG. 14. If the Alternatives' Ambiguities list is not then empty, the process continues; however, once the Alternatives' Ambiguities list is empty, all alternatives have been ranked. The system then solves the point values, as referred to as Step 5 in FIG. 11, to obtain the scores for the alternatives, and then presents the ranked alternatives to the user. An overview of this process is illustrated in FIG. 17. The user can continue to calibrate the APS if he or she wishes, but the ranking of the alternatives will not change unless the user undoes some prior decisions or introduces new alternatives to the restricted group under consideration.

If the Alternatives' Ambiguities list is not now empty, each alternative on the Best Alternatives list is compared with every other, and if it is not possible for an alternative to be ranked ahead of or equal to another alternative given the decisions on the Explicitly Resolved list and the inherent inequalities, then that alternative is removed from the Best Alternatives list. After this processing, the alternatives on the Best Alternatives list are again compared with each other, and if it is not possible for any of the alternatives to be ranked ahead of one of the others, the list is known to contain either one 'best' (i.e., top-ranked) alternative, or equally top-ranked alternatives.

Figure 18:
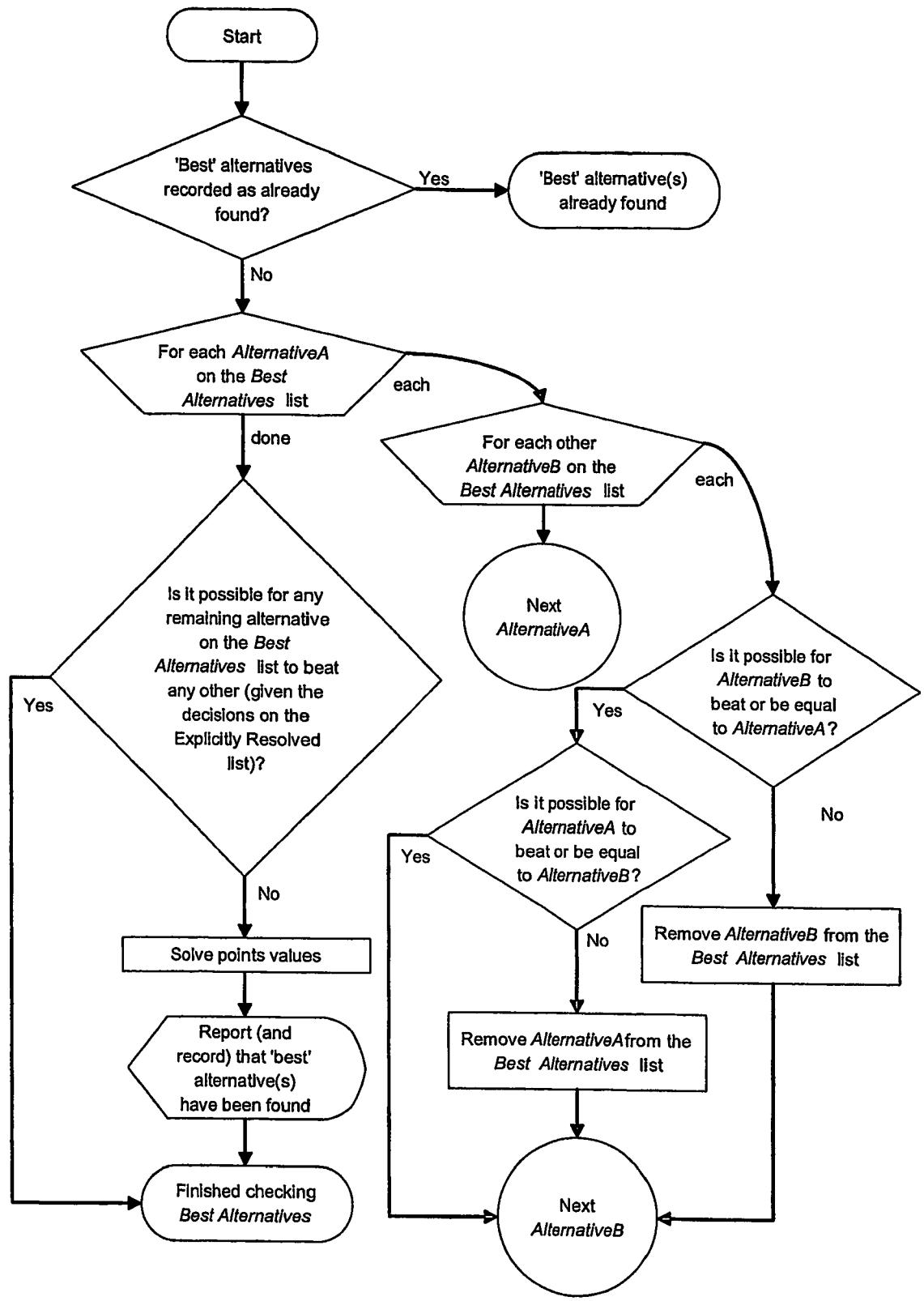
FIG. 18 is a flow diagram illustrating the preferred steps for determining whether the best alternative has been identified from a restricted group of alternatives.

The system then solves the point values, as referred to as Step 5 in FIG. 11, to obtain the scores for the alternatives, and then presents the alternative or alternatives on the Best Alternatives list to the user. An overview of this process, which was referred to as Approach 3 in the description of the method of the invention, is illustrated in FIG. 18.

The user can continue to fully calibrate the APS if he or she wishes, but the highest ranking alternative or alternatives will not change unless the user undoes some prior decisions or introduces new alternatives to the restricted group under consideration.

If a particular number of 'best' alternatives is required—for example, if the objective is to select the top three alternatives—this process can be repeated as many times as required after setting aside the top-ranked alternative or alternatives (for later reporting) from the Loaded Alternatives list and regenerating the Best Alternatives list, as illustrated in FIG. 16. The test as to whether it is possible for a given alternative to be ranked ahead of or equal to another alternative given the decisions on the Explicitly Resolved list and the inherent inequalities is similar to (but different from) that used in determining whether an ambiguity is resolved. This test, using linear programming, is discussed below.

Figure 19:
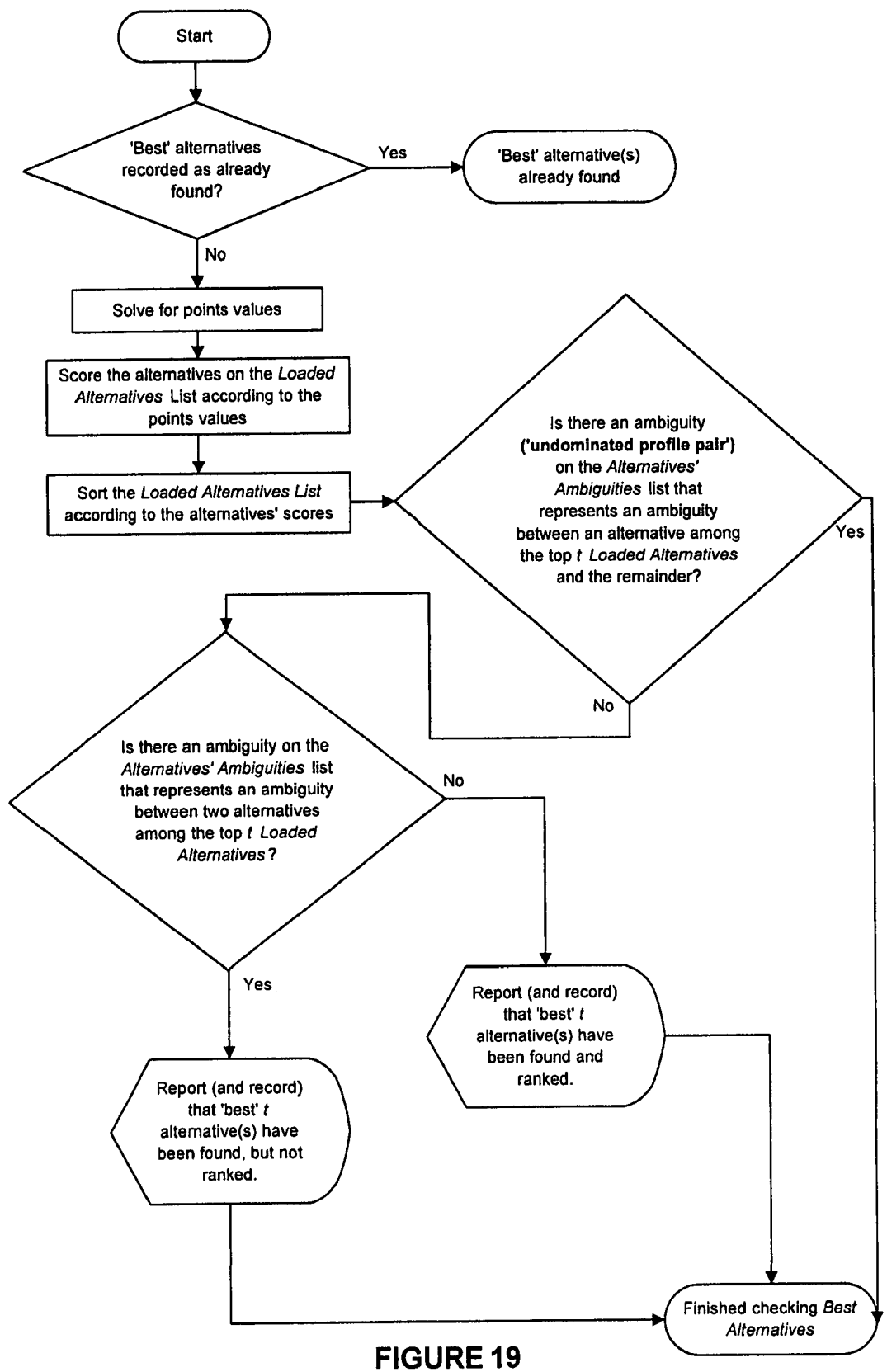
FIG. 19 is a flow diagram illustrating particularly preferred steps for determining whether the best set of alternatives has been identified from a restricted group of alternatives.

However, the particularly preferred way of determining whether a particular number (t) of 'best' alternatives has been found is as follows. An overview of this process, which was referred to as Approach 4 in the description of the method of the invention, is illustrated in FIG. 19.

First, the system is solved as in Step 5 below, establishing a set of points values. Second, these points values are used to score each alternative on the Loaded Alternatives list.

Third, the Loaded Alternatives list is sorted by each alternative's score. Fourth, the ambiguities on the Alternatives' Ambiguities list representing an ambiguity involving any of the top t alternatives (the t alternatives with the highest scores) on the Loaded Alternatives list and the other alternatives on the Loaded Alternatives list are sought.

If no such ambiguities are found, the top t alternatives are ranked ahead of the other alternatives and so the 'best' t alternatives have been found and this result can be reported to the user. If finding the 'best' t alternatives is the objective, the process can stop before the APS is fully calibrated.

Fifth, if the 'best' t alternatives were found, the ambiguities on the Alternatives' Ambiguities list representing ambiguities involving alternatives in the top t alternatives on the Loaded Alternatives list are identified. If no such ambiguities are found, the best t alternatives are also ranked among each other, and this relationship will not change with further resolution of ambiguities, and this result can be reported to the user. If finding the 'best' t alternatives and ranking these t alternatives is the objective, the process can stop before the APS is fully calibrated.

If the To Be Resolved list is not empty, the program returns to Step 3. If instead the To Be Resolved list is empty and the Current Degree is equal to the number of criteria (x) in the particular APS being calibrated, the program proceeds to Step 5. Alternatively, if the Current Degree is less than the APS's number of criteria (and the To Be Resolved list is empty), the Current Degree is increased by '1' and the program returns to Step 2.

However, the user is able to stop the process before the APS is fully calibrated as tests have shown that the ranking of all hypothetical alternatives after an APS is fully calibrated correlates very well with the ranking after only the $2^{nd}$-degree ambiguities have been resolved. Such a decision to stop the process would depend on the precision required of the resulting APS by the user.

Figure 15:
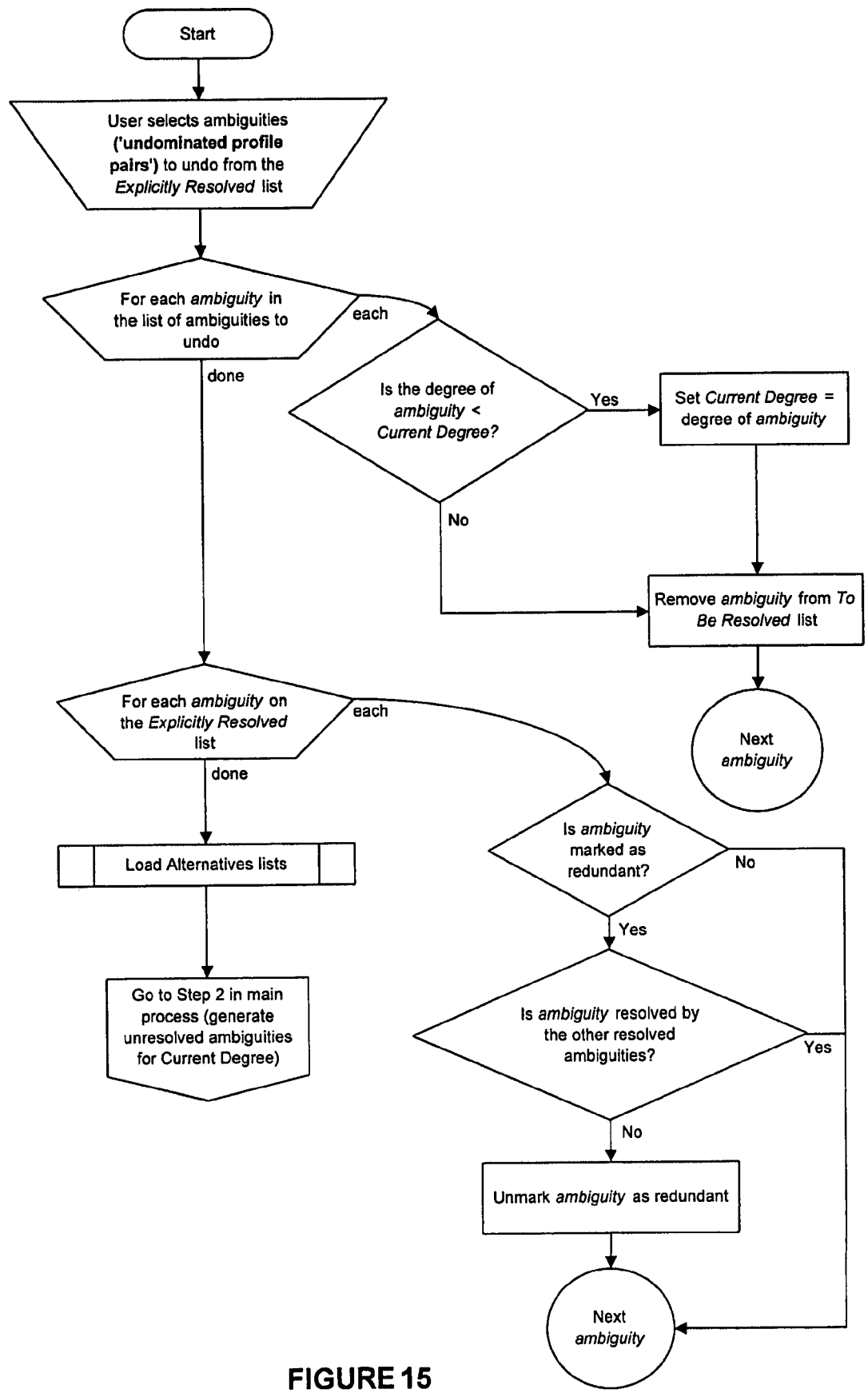
FIG. 15 is a flow diagram illustrating preferred steps for an undo module (whereby explicitly resolved ambiguities are revised) of the computer program of the invention.

The user may choose at any time to view the explicitly resolved ambiguities for all degrees and 'undo' any of them. Explicitly resolved ambiguities that are 'redundant' are displayed in a different colour or shade to indicate that undoing them alone will have no material effect. An overview of the 'undo module', as referred to in FIG. 11, is illustrated in FIG. 15.

When explicitly resolved ambiguities are undone, they are deleted from the Explicitly Resolved list. If any non-redundant explicitly resolved ambiguities are undone, the explicitly resolved ambiguities marked redundant are re-tested for whether or not they are still redundant, and marked accordingly.

Also, if non-redundant ambiguities are undone, the Current Degree variable is reset to the degree of the lowest-degree ambiguity that was undone, the Alternatives' Ambiguities and Best Alternatives lists are regenerated as illustrated in FIG. 16, and the program restarts from Step 2 of the computer program as set out above.

When all the ambiguities for all degrees have been resolved, the list of explicitly resolved inequalities/equalities and inherent inequalities is solved via linear programming for the point values of the APS. These are presented to users, as well as a range of 'summary statistics', including the numbers of ambiguities and explicitly resolved ambiguities at each degree and, if the user wants them, the inequalities/equalities that were chosen and the restricted group of alternatives, if they were specified, and their rankings.

In the interests of deriving point values that are integers and as low as possible, thereby maximising their 'user-friendliness', integer programming and an objective function that minimises the sum of the variables (for example, a1+a2+a3+b1+b2+b3+c1+c2+c3, etc.) may be specified.

Alternatively, were it desired by users that the point values be normalised to a particular range for the profile total scores, such as 0 to 100, the derived point values are scaled accordingly. However this usually forces some point values to be fractions, which is not as 'user-friendly' as integers. Accordingly both integer and normalised values can be calculated and presented.

The user may be given the opportunity of checking the consistency or repeatability of his or her decisions with respect to explicitly or implicitly resolved ambiguities. Beginning with the $2^{nd}$-degree, ambiguities are generated by the 'efficient ambiguities generator' and the above-mentioned derived point values are used to determine their rankings, corresponding to the user's explicitly or implicitly resolved ambiguities. The user is then re-presented with the ambiguities and asked to rank them again. He or she is informed as to whether or not the checked decisions agree. If the decisions agree, then they are consistent. If the decisions are contradictory, then they are inconsistent. The numbers of agreements and disagreements are counted and reported to the user.

The user may also be given the opportunity of comparing the current system he or she has created with another existing and saved system created earlier by the program (provided they have the same numbers of criteria and categories). This comparison is in terms of the explicitly or implicitly resolved ambiguities, the overall ranking of all possible alternatives that are represented by the criteria and categories, and the overall ranking of the restricted group of alternatives. The purpose of these comparisons is to gauge the validity and reliability of the overall user's decisions and the resulting rankings of all possible alternatives and the restricted group of alternatives.

The user may also be given the opportunity of copying the current system and changing some explicitly or implicitly resolved ambiguities (while retaining others), or all of them, respectively—with the possibility of inviting another user to make his or her own decisions—and performing the above-mentioned comparisons.

The user may also be given the opportunity of copying the current system and inserting other point values from another APS that he or she is familiar with—for example, whose point values were determined in a different way—and performing the above-mentioned comparisons.

As explained above, linear programming (LP) may be used in the computer program of the invention. Specifically, LP may be used at Steps 2 and 4 to determine whether the resolution of an ambiguity is implied by the inequalities/equalities on the Explicitly Resolved list, as well as in Step 1 in determining whether the alternatives on the Loaded Alternatives list are ranked and/or the best alternative or alternatives found. In Step 5, LP is used for deriving the point values when all ambiguities have been resolved. The following features must be observed when LP is used.

First, the inequalities/equalities and inherent inequalities must be converted to a form suitable for LP. For example, the inherent inequalities a3>a2>a1 must be written as $a2-a1 \geq 1$ and $a3-a2 \geq 1$, and the explicitly resolved ambiguities a2+b2=a3+b1 and a2+b3>a3+b2 as a2+b2−a3−b1=0 and $a2+b3-a3-b2 \geq 1$. Setting the RHS of the weak inequality to "1" (that is, 'epsilon') corresponds to the initial inequality being strict, although other values for epsilon may perform at least as well.

Second, in Steps 2 and 4, the LP objective function need only be "0", as all that is being tested for is the existence of a solution rather than a particular optimal solution.

Finally, because the variables corresponding to the lowest category on the respective criteria (a1, b1, c1, and so on) are, effectively, 'numeraires' or 'baseline' values for the respective criteria, they can be set equal to zero, thereby eliminating them from the system to be solved and increasing the efficiency of the LP algorithm.

Below is an illustration of how LP may be used to test whether or not an ambiguity on the To Be Resolved list is implied by the inequalities/equalities on the Explicitly Resolved list by way of example only.

For the sake of the example, suppose the ambiguity in question is a1+b3+c3 vs a2+b1+c1 and the following inequalities/equalities are on the Explicitly Resolved list (where the underlined inequality signifies that it is 'redundant' in the sense, as discussed earlier, that it is implied by others on the list).

$a2+b2=a3+b1$ $a2+b3>a3+b2$ $a3+c1>a1+c3$ $a2+c1>a1+c3$ $b1+c2=b3+c1$ $b1+c3=b3+c2$ $a1+b2+c3>a2+b1+c1$

In addition, the inherent inequalities of this exemplar APS with x=3 and y=3 are:

$a3>a2>a1$ $b3>b2>b1$ $c3>c2>c1$

These inequalities/equalities (and ignoring the underlined redundant inequality)—and given $a1=b1=c1=0$ (as discussed above)—are represented in a form suitable for LP, as follows. By definition, a solution (in terms of the point values) exists to the LP problem:

minimise 0 subject to: $a2+b2-a3=0$ $a2+b2-a3-b2\geq 1$ $a2-c3\geq 1$ $c2-b3=0$ $c3-b3-c2=0$ $b2+c3-a2\geq 1$ $a2\geq 1$ $a3-a2\geq 1$ $b2\geq 1$ $b3-b2\geq 1$ $c2\geq 1$ $c3-c2\geq 1$ To test whether $a1+b3+c3$ vs $a2+b1+c1$ is implied by the inequalities/equalities on the Explicitly Resolved list, the above LP problem is first augmented with $b3+c3-a2\geq 1$ (i.e., $a1+b3+c3>a2+b1+c1$), and tested for whether or not a solution to this new problem exists.

A solution does exist, and so the original LP problem is next augmented with $a2-b3-c3\geq 1$ (i.e., $a2+b1+c1>a1+b3+c3$) and tested for whether or not a solution to this second new problem exists.

In this case there is no solution, and so it must be inferred that either $a1+b3+c3>a2+b1+c1$ or $a1+b3+c3=a2+b1+c1$ is implied by the inequalities/equalities on the Explicitly Resolved list. The first inequality above is easily confirmed here by adding b3>b2 to the last explicitly resolved ambiguity on the first list above: $(b3>b2)+(a1+b2+c3>a2+b1+c1)=(a1+b3+c3>a2+b1+c1)$. This alternative approach is variant 1 of Approach 1 explained earlier.

Therefore the ambiguity is implicitly resolved and deleted from the To Be Resolved list. (This process is performed for all the ambiguities on the To Be Resolved list.)

In managing the Best Alternatives list in Step 1 above, a similar approach is used to determine whether it is possible for one alternative to either be ranked higher ('beat') or equal to another. For example, in testing the alternative pair $a1+b2+c3$ vs $a2+b1+c1$, the original LP problem is augmented with $b2+c3-a2\geq 0$. If a solution does not exist, then $a2+b1+c1$ is known to be ranked ahead of $a1+b2+c3$, and $a1+b2+c3$ is removed from the Best Alternatives list. Otherwise the original LP problem is next augmented with $a2-b2-c3\geq 0$. If a solution does not exist, then $a1+b2+c3$ is known to be ranked ahead of $a2+b1+c1$ and so $a2+b1+c1$ is removed from the Best Alternatives list. If a solution did not exist to either the first or the second problems, the alternatives are either equal, and so might be ranked top equal, or the relationship between the alternatives is still ambiguous: and so both alternatives are left on the list.

The foregoing describes the invention including preferred forms thereof. Alterations and modifications as will be obvious to those skilled in the art are intended to be incorporated within the scope hereof, as defined in the accompanying claims.

The invention claimed is:

1. A computer-implemented decision support method for two or more pre-defined criteria and two or more profiles, each criterion comprising two or more pre-defined and ordinally ranked categories, each profile comprising a set of two or more of the criteria, each criterion in the set associated with one of the categories for that criterion, the method comprising:

performing a comparative assessment of profiles, wherein the comparative assessment comprises an ordinal pairwise ranking of profile pairs, ordinal pairwise ranking of profile pairs comprising:
generating undominated profile pairs, each undominated profile pair comprising two profiles wherein one profile has a higher ranked category on at least one criterion and a lower ranked category on at least one other criterion than the other profile;
presenting the undominated profile pairs to a decision maker for ordinal pairwise ranking;
receiving from the decision maker an ordinal pairwise ranking of the profiles; and
identifying profile pairs that are implicitly ordinally pairwise ranked as corollaries of ordinal pairwise rankings performed and excluding the profile pairs from subsequent presentation to the decision maker;

the decision support method further comprising:
solving a system of equalities/inequalities that represents the ordinal pairwise rankings of profile pairs to obtain at least one output, the at least one output including a point value for each category on each criterion, a ranking of all possible profiles, or a ranking of a subset of all possible profiles.

2. The computer-implemented decision support method of claim 1 wherein the step of generating undominated profile pairs comprises:
generating undominated profile pairs with z criteria for each profile, wherein z is a number greater than or equal to two and less than or equal to the number of possible criteria.

3. The computer-implemented decision support method of claim 2 wherein the ordinal ranking of profile pairs is repeated for at least one other value of z, and wherein for any other value of z, the step of generating undominated profile pairs is followed by a step of excluding profile pairs that are pairwise ranked as corollaries of the ordinal pairwise rankings performed for any previous value of z.

4. The computer-implemented decision support method of claim 2 wherein the step of generating undominated profile pairs with z criteria for each profile comprises:
- taking all combinations of all of the criteria, z criteria at-a-time; and
- for each combination of the criteria, pairing it with a replica of itself to form a pair of combinations of the criteria; and
- for each pair of the combinations of the criteria, associating the criteria with all combinations of the pre-defined categories for the criteria in the pair to form all unique undominated profile pairs with z criteria possible from each pair of the combinations of the criteria.

5. The computer-implemented decision support method of claim 4 wherein the step of, for each pair of the combinations of the criteria, associating the criteria with all combinations of the pre-defined categories for the criteria in the pair, comprises the steps of:
- listing the numbers between 1 and $2^{z-1}-1$ in binary form using z bits as a list of first z-tuples, and pairing each first z-tuple with a further ordered z-tuple of bits, wherein each '0' or '1' of the further ordered z-tuple is the complement of each of the original z bits of the first z-tuple, to form $2^{z-1}-1$ pairs of ordered z-tuples of bits; and
- for each pair of ordered z-tuples of bits, generating an undominated profile pair by defining each of the z criteria of a first profile in the pair according to the relative magnitudes of the bits in the first z-tuple and defining each of the z criteria of the second profile in the pair according to the relative magnitudes of the bits in the further z-tuple.

6. The computer-implemented decision support method of claim 1 further comprising the step of excluding undominated profile pairs that are theoretically impossible.

7. The computer-implemented decision support method of claim 1 wherein the step of generating undominated profile pairs further comprises the step of:
- generating all possible undominated profile pairs that are consistent with a pre-defined subset of all possible profiles, and storing them on a temporary list;
- and wherein the decision support method further comprises the steps of:
  - when an ordinal pairwise ranking of profile pairs is received from the decision maker, removing all members of the temporary list that are implicitly ordinally pairwise ranked as corollaries of any ordinal pairwise rankings of profile pairs already performed; and
  - when the temporary list is empty, solving the system of equalities/inequalities representing the ordinal pairwise rankings to rank the pre-defined subset of profiles.

8. The computer-implemented decision support method of claim 1 wherein the step of generating undominated profile pairs further comprises the step of:
- generating all possible undominated profile pairs that are consistent with a pre-defined subset of all possible profiles, and storing them on a temporary list;
- and wherein the decision support method further comprises the steps of:
  - when an ordinal pairwise ranking of profile pairs is received from the decision maker, removing all members of the temporary list that are implicitly ordinally pairwise ranked as corollaries of any ordinal pairwise rankings of profile pairs already performed; and
  - solving the system of equalities/inequalities representing the ordinal pairwise rankings to rank the pre-defined subset of profiles and designating profiles that cannot be ranked below any other profile as top-ranked profiles;
- wherein the process of ordinal pairwise ranking is halted once the temporary list contains no undominated profile pair for which one profile in the pair is one of the top-ranked profiles and the other profile in the pair is not a top-ranked profile, and the number of top-ranked profiles is less than or equal to a required number of top-ranked profiles.

9. The computer-implemented decision support method of claim 1 wherein the step of identifying undominated profile pairs that are implicitly ordinally pairwise ranked as a corollary of ordinal pairwise rankings already performed comprises repeating, for each undominated profile pair not yet presented to the decision maker, the steps of:
- imposing a strict ordinal ranking of the profiles in the profile pair, and including the resulting inequality with the system of equalities/inequalities that represents the ordinal pairwise rankings of profile pairs already performed; and
- testing the system of equalities/inequalities for the existence of a solution in terms of point values,
- wherein if a solution does not exist, then the profile pair is identified as implicitly ordinally pairwise ranked as a corollary of ordinal pairwise rankings already performed but wherein, if a solution does exist, then the method further comprises the steps of:
  - for the same profile pair, imposing a reverse strict ordinal ranking of the profiles in the profile pair, and including the resulting inequality with the system of equalities/inequalities representing the ordinal pairwise rankings of profile pairs already performed; and
  - testing the system of equalities/inequalities for the existence of a solution in terms of point values,
  - wherein if a solution does not exist, then the profile pair is identified as implicitly ordinally pairwise ranked as a corollary of ordinal pairwise rankings already performed, but wherein if a solution does exist, then the profile pair is identified as not implicitly ordinally pairwise ranked as a corollary of ordinal pairwise rankings already performed.

10. A decision support system comprising:
- a data memory having stored thereon two or more pre-defined criteria, each criterion capable of being associated with two or more pre-defined and ordinally ranked categories; and
- a processor coupled to the data memory, the processor configured to perform a comparative assessment of profiles, each profile comprising a set of two or more of the criteria, each criterion in the set-associated with one of the categories for that criterion, wherein the comparative assessment comprises the ordinal pairwise ranking of profile pairs, the ordinal pairwise ranking of profile pairs comprising:
- generating undominated profile pairs, each undominated profile pair comprising two profiles wherein one profile has a higher ranked category on at least one criterion and a lower ranked category on at least one other criterion than the other profile;
- presenting undominated profile pairs to a decision maker on a display;
- receiving from the decision maker via an input device an ordinal ranking of the profiles in each profile pair presented on the display; and
- identifying profile pairs that are implicitly ordinally pairwise ranked as corollaries of ordinal pairwise rankings performed and excluding the profile pairs from subsequent presentation to the decision maker;

wherein the processor is further configured to solve a system of equalities/inequalities that represents the ordinal pairwise rankings to obtain at least one output, the at least one output including a point value for each category on each criterion, a ranking of all possible profiles, or a ranking of a subset of all possible profiles.

11. A decision support system comprising:

a data memory having stored thereon two or more pre-defined criteria, each criterion capable of being associated with two or more pre-defined and ordinally ranked categories; and a processor coupled to the data memory, the processor configured to perform a comparative assessment of profiles, each profile comprising a set of two or more of the criteria, each criterion in the set-associated with one of the categories for that criterion, wherein the comparative assessment comprises the ordinal pairwise ranking of profile pairs, the ordinal pairwise ranking of profile pairs comprising:

generating undominated profile pairs, each undominated profile pair comprising two profiles wherein one profile has a higher ranked category on at least one criterion and a lower ranked category on at least one other criterion than the other profile;

presenting undominated profile pairs to a decision maker on a display;

receiving from the decision maker via an input device an ordinal ranking of the profiles in each profile pair presented on the display; and identifying profile pairs that are implicitly ordinally pairwise ranked as corollaries of ordinal pairwise rankings performed and excluding the profile pairs from subsequent presentation to the decision maker;

wherein the processor is further configured to solve a system of equalities/inequalities that represents the ordinal pairwise rankings to obtain at least one output, the at least one output including a point value for each category on each criterion, a ranking of all possible profiles, and a ranking of a subset of all possible profiles.

12. A computer-implemented decision support method for two or more pre-defined criteria and two or more profiles, each criterion comprising two or more pre-defined and ordinally ranked categories, each profile comprising a set of two or more of the criteria, each criterion in the set associated with one of the categories for that criterion, the method comprising:

performing a comparative assessment of profiles, wherein the comparative assessment comprises an ordinal pairwise ranking of profile pairs, ordinal pairwise ranking of profile pairs comprising:

generating undominated profile pairs, each undominated profile pair comprising two profiles wherein one profile has a higher ranked category on at least one criterion and a lower ranked category on at least one other criterion than the other profile;

presenting the undominated profile pairs to a decision maker for ordinal pairwise ranking;

receiving from the decision maker an ordinal pairwise ranking of the profiles; and identifying profile pairs that are implicitly ordinally pairwise ranked as corollaries of ordinal pairwise rankings performed and excluding the profile pairs from subsequent presentation to the decision maker;

the decision support method further comprising:

solving a system of equalities/inequalities that represents the ordinal pairwise rankings of profile pairs to obtain at least one output, the at least one output including a point value for each category on each criterion, a ranking of all possible profiles, and a ranking of a subset of all possible profiles.

\* \* \* \* \*